United States Patent
Xu et al.

(10) Patent No.: US 10,862,598 B2
(45) Date of Patent: Dec. 8, 2020

(54) ELECTRONIC DEVICE AND METHOD IN RADIO COMMUNICATION SYSTEM

(71) Applicant: Sony Corporation, Tokyo (JP)

(72) Inventors: Jin Xu, Beijing (CN); Hang Yang, Beijing (CN); Chaonan He, Beijing (CN); Dongru Li, Beijing (CN); Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/330,766

(22) PCT Filed: Mar. 26, 2018

(86) PCT No.: PCT/CN2018/080486
§ 371 (c)(1),
(2) Date: Mar. 6, 2019

(87) PCT Pub. No.: WO2018/177246
PCT Pub. Date: Oct. 4, 2018

(65) Prior Publication Data
US 2020/0186264 A1  Jun. 11, 2020

(30) Foreign Application Priority Data
Mar. 28, 2017 (CN) .......................... 2017 1 0192890

(51) Int. Cl.
*H04B 17/345* (2015.01)
*H04W 72/04* (2009.01)
*H04B 7/0452* (2017.01)

(52) U.S. Cl.
CPC ...... *H04B 17/345* (2015.01); *H04W 72/0413* (2013.01); *H04B 7/0452* (2013.01)

(58) Field of Classification Search
CPC .............. H04W 72/0413; H04W 72/08; H04B 17/345; H04B 7/0452
(Continued)

(56) References Cited

U.S. PATENT DOCUMENTS

| 2008/0232320 A1* | 9/2008 | Lee ........................ H04W 16/10 370/329 |
| 2013/0208604 A1* | 8/2013 | Lee ........................ H04L 5/0037 370/252 |

(Continued)

FOREIGN PATENT DOCUMENTS

| CN | 101932099 A | 12/2010 |
| WO | 2014113524 A1 | 7/2014 |

(Continued)

OTHER PUBLICATIONS

International Search Report dated May 24, 2018 for PCT/CN2018/080486 filed on Mar. 26, 2018, 9 pages including English Translation.

*Primary Examiner* — Phong La
(74) *Attorney, Agent, or Firm* — Xsensus, LLP

(57) ABSTRACT

Provided are an electronic device and a method in a radio communication system. The electronic device comprises a processing circuit. The processing circuit is configured to determine, based on information indicating inter-cell interference and information indicating intra-cell interference fed back by multiple user equipment, a transmission resource configuration regarding the multiple user equipment. According to at least one embodiment of the present disclosure, it can effectively solve the problem that system overheads for determining multi-user pairing significantly increase due to the presence of a large number of user equipment to be paired when multi-user multiple-input and multiple-output (MU-MIMO) transmission is performed, while system fairness and throughputs are also achieved.

16 Claims, 11 Drawing Sheets

(58) Field of Classification Search
USPC ........................................................ 370/252
See application file for complete search history.

(56) References Cited

U.S. PATENT DOCUMENTS

| | | | | |
|---|---|---|---|---|
| 2014/0369293 A1* | 12/2014 | Guo | ................... | H04L 5/0073 |
| | | | | 370/329 |
| 2015/0156786 A1* | 6/2015 | Kim | ................... | H04B 7/0452 |
| | | | | 370/329 |
| 2015/0200755 A1* | 7/2015 | Hammarwall | ........ | H04L 5/0048 |
| | | | | 370/329 |
| 2015/0245193 A1* | 8/2015 | Xiong | ................... | H04W 8/005 |
| | | | | 370/328 |
| 2015/0263796 A1* | 9/2015 | Nam | ................... | H04B 7/0452 |
| | | | | 370/329 |
| 2015/0270917 A1* | 9/2015 | Roman | ................ | H04J 11/005 |
| | | | | 370/329 |
| 2016/0373971 A1* | 12/2016 | Kulal | ................. | H04W 36/30 |
| 2017/0006492 A1* | 1/2017 | Khoshnevisan | ...... | H04L 5/0073 |
| 2017/0142746 A1* | 5/2017 | Koorapaty | ............ | H04W 16/14 |
| 2017/0164206 A1* | 6/2017 | Madan | ................. | H04W 16/10 |
| 2018/0035251 A1* | 2/2018 | Bitra | .................... | H04L 5/0048 |
| 2018/0084559 A1* | 3/2018 | Kim | ................... | H04W 72/082 |
| 2018/0206140 A1* | 7/2018 | Panteleev | ............. | H04W 76/14 |
| 2019/0081761 A1* | 3/2019 | Liu | ....................... | H04L 5/0053 |
| 2019/0116586 A1* | 4/2019 | Basu Mallick | ....... | H04W 72/02 |
| 2019/0297602 A1* | 9/2019 | You | ..................... | H04L 1/0047 |
| 2019/0349103 A1* | 11/2019 | Wang | ................. | H04B 7/0626 |

FOREIGN PATENT DOCUMENTS

| | | | |
|---|---|---|---|
| WO | 2017003944 A1 | 1/2017 | |
| WO | 2017016524 A1 | 2/2017 | |

\* cited by examiner

ELECTRONIC DEVICE AND METHOD IN RADIO COMMUNICATION SYSTEM

CROSS-REFERENCE TO RELATED APPLICATIONS

This application is based on PCT filing PCT/CN2018/080486, filed Mar. 26, 2018, which claims the priority to Chinese Patent Application No. 201710192890.4, titled "ELECTRONIC DEVICE AND METHOD IN WIRELESS COMMUNICATION SYSTEM", filed with the Chinese Patent Office on Mar. 28, 2017, the entity of which is incorporated herein by reference.

FIELD

The present disclosure relates to the field of wireless communications, and in particular to an electronic device and a method in a wireless communication system for reducing system overheads in determining transmission resource configurations of multiple user equipment.

BACKGROUND

A frequency division duplex-multiple-input-multiple-output (FD-MIMO) system has a prominent advantage in the capacity increase caused by multi-user MIMO (MU-MIMO, multi-user multiple-input and multiple-output). However, without interference measurement, a base station may pair several user equipment with high interference together because the based station does not know the interference among the user equipment. That is, common time frequency resources are allocated for such several user equipment, which results in severe degradation of system performance. For this reason, before multi-user pairing, the base station may generally pre-schedule resources, such that the user equipment is presumptively paired with another user equipment so as to measure mutual interference among the user equipment and the other user equipment that are presumptively paired and to report relevant measurement results to the base station. The base station determines which of the user equipment are to be paired together based on the acquired information on the interference.

However, as the number of user equipment to be paired in a cell increases, the presumptive multi-user pairing throughout the entire cell in the traditional way may result in an excessively large system overhead. In addition, a considerable part of such extensive pairing assumptions is unnecessary due to certain reasons (e.g., signal to interference plus noise ratios (SINRs) may differ among the user equipment and the like), thereby resulting in a severe resource waste.

SUMMARY

The present disclosure is briefly summarized hereinafter, so as to provide basic understandings of some aspects in relation to the present disclosure. However, it is understood that the summary is not an exhaustive overview of the present disclosure. It is neither intended to identify key or critical parts of the present disclosure, nor intended to delineate the scope of the present disclosure. It merely functions to present some concepts of the present disclosure in a simplified form to be used as a prelude to a more detailed description stated later.

In view of this, an object of at least one embodiment of the present disclosure is to provide an electronic device and a method in a wireless communication system for reducing system overheads in determining resource configurations for MU-MIMO transmission performed by multiple user equipment (i.e., determining how to pair the multiple user equipment).

According to an aspect of the present disclosure, there is provided an electronic device in a wireless communication system. The electronic device includes processing circuitry which is configured to determine, based on information indicating inter-cell interference and information indicating intra-cell interference which are fed back by multiple user equipment, transmission resource configurations regarding the multiple user equipment.

According to another aspect of the present disclosure, there is further provided an electronic device in a wireless communication system. The electronic device includes processing circuitry which is configured to generate, based on inter-cell resource configuration of a base station, information indicating inter-cell interference suffered by user equipment, the information being to be fed back to the base station; and to generate, based on intra-cell resource configuration of the base station, information indicating intra-cell interference suffered by the user equipment, the information being to be fed back to the base station, for the base station to determine transmission resource configuration with respect to the user equipment according to the information indicating inter-cell interference and the information indicating intra-cell interference.

According to another aspect of the present disclosure, there is further provided a method in a wireless communication system. The method includes determining, based on the information indicating inter-cell interference and the information indicating intra-cell interference which are fed back by multiple user equipment, transmission resource configuration regarding the multiple user equipment.

According to another aspect of the present disclosure, there is further provided a method in a wireless communication system. The method includes: generating, based on inter-cell resource configuration of a base station, information indicating inter-cell interference suffered by user equipment, the information being to be fed back to the base station; and generating, based on intra-cell resource configuration of the base station, information indicating intra-cell interference suffered by the user equipment, the information being to be fed back to the base station, so that the base station may determine transmission resource configuration with respect to the user equipment according to the information indicating inter-cell interference and the information indicating intra-cell interference.

According to other aspects of the present disclosure, there are also provided computer program codes and a computer program product for implementing the abovementioned methods according to the present disclosure, and a computer readable storage medium having the computer program codes recorded thereon for implementing the abovementioned methods according to the present disclosure.

In the embodiments of the present disclosure, the base station determines, based on inter-cell interference information and intra-cell interference information, the resource configurations during MU-MIMO transmission performed by multiple user equipment (i.e., determining which of the user equipment should share the same time frequency resources, which of the user equipment should perform single user transmission, and the like), such that the system overheads during multi-user pairing are greatly reduced and the resource utilization is improved, as compared with the conventional technology.

Other aspects of embodiments of the present disclosure will be presented in the detailed description part hereinafter, wherein the detailed description is provided for sufficiently disclosing preferred embodiments of the embodiments of the present disclosure and is by no means limiting.

BRIEF DESCRIPTION OF THE DRAWINGS

The disclosure can be better understood with reference to the detailed description given below in conjunction with the accompanying drawings, throughout which identical or like reference signs denote identical or like components. The accompanying drawings together with the following detailed description are incorporated into and form a part of the specification and serve to further illustrate the preferred embodiments of the disclosure and to explain the principle and advantages of the disclosure by way of example. In the drawings.

DETAILED DESCRIPTION OF EMBODIMENTS

Figure 1:
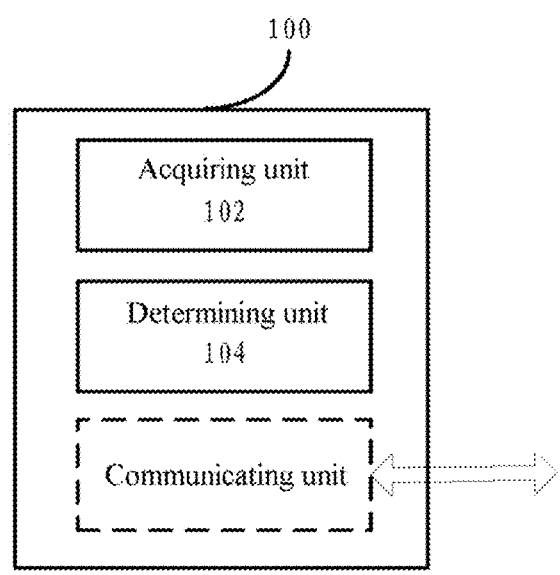
FIG. 1 is a block diagram illustrating an example of a functional configuration of an electronic device on a base station side in a wireless communication system according to an embodiment of the present disclosure.

Exemplary embodiments of the present disclosure are described below in conjunction with the accompanying drawings. For conciseness and clarity, not all features of an actual embodiment are described in this specification. However, it should be appreciated that numerous implementation-specific decisions shall be made during developing any of such actual implementations so as to achieve the developer's specific goals, for example, to comply with system-related and business-related constraining conditions which vary from one implementation to another. Furthermore, it should also be appreciated that although the development work may be very complicated and time-consuming, for a person skilled in the art benefiting from the present disclosure, such development work is only a routine task.

Moreover, it shall further be noted that only those device structures and/or processing steps closely relevant to the solutions of the present disclosure are illustrated in the drawings while other details less relevant to the disclosure are omitted so as not to obscure the disclosure due to those unnecessary details.

Before specifically describing the embodiments of the present disclosure, it is to be noted that, for convenience of description, when it is mentioned that any two or more user equipment are "paired together" hereinafter, this usually means that the base station configures the same time frequency resource for such user equipment. When it is mentioned that "pairing assumptions" are performed for any two or more user equipment, this usually means that the base station perform pre-scheduling to configure corresponding inter-cell resources and intra-cell resources for such user equipment, such that the user equipment may feed back information on interference in different pairing schemes based on resource configurations of the base station, for the base station to determine whether or not such user equipment can be paired together.

In order to improve the resource utilization the base station may perform multi-user pairing for the user equipment with small mutual interference so that such user equipment may share transmission resources. In order to avoid a problem that a channel condition when the user equipment measures interference is different from the channel condition when the base station actually schedules resources, the base station may perform pre-scheduling, that is to perform multi-user pairing assumptions between the user equipment and other user equipment. However, as the number of users increases, overheads for performing multi-user pairing assumptions and feedback overheads also increase rapidly. The technology of the present disclosure is provided to solve such a problem.

Hereinafter, embodiments of the present disclosure are described in detail with reference to FIGS. 1 to 14. Hereinafter, the description is given in the following order.

1. Electronic device on a base station side in a wireless communication system according to an embodiment of the present disclosure 2. Electronic device on a user equipment side in a wireless communication system according to an embodiment of the present disclosure 3. Signaling interaction process for a multi-user pairing strategy according to an embodiment of the present disclosure 4. Method on a base station side in a wireless communication system according to an embodiment of the present disclosure 5. Method on a user equipment side in a wireless communication system according to an embodiment of the present disclosure 6. Computing device for implementing an electronic device and a method according to the present disclosure 7. Application examples of the technology according to the present disclosure 7-1. Application example regarding the base station 7-2. Application example regarding the user equipment (1. Electronic Device on a Base Station Side in a Wireless Communication System According to an Embodiment of the Present Disclosure)

FIG. 1 is a block diagram showing an example of a functional configuration of an electronic device on a base station side in a wireless communication system according to an embodiment of the present disclosure.

As shown in FIG. 1, an electronic device 100 according to the embodiment may include an acquiring unit 102 and a determining unit 104.

The acquiring unit 102 may be configured to acquire information indicating inter-cell interference (first interference information) and information indicating intra-cell interference (second interference information), which are fed back by multiple user equipment.

The determining unit 104 may be configured to determine, based on the acquired information indicating inter-cell interference and the acquired information indicating intra-cell interference, transmission resource configurations regarding the multiple user equipment, that is, to determine pairing schemes of such multiple user equipment. In this way, multi-user pairing schemes are determined by the base station based on inter-cell interference information and intra-cell interference information, such that resource utilization is improved while system overheads for performing multi-user pairing are reduced.

There are some common algorithms for multi-user pairing, such as a random pairing scheduling (RPS) algorithm, an orthogonal pairing scheduling (OPS) algorithm and a determinant pairing scheduling (DPS) algorithm. With the determinant pairing scheduling algorithm, determination is made based on a channel information matrix of the user equipment. In the process of deriving the formula of this algorithm, there is a prerequisite that the user equipment has a high SINR, which may adversely affect fairness among the user equipment and may be harmful to improve system throughputs. However, if the user equipment with a low SINR are not disregarded, when they are involved in pairing, and especially when the user equipment with a high SINR is paired with the user equipment with a low SINR, the former may seriously interfere the latter, which may be not desired. Therefore, preferably, it is desired that the user equipment with similar SINRs are paired to achieve a balance between system fairness and throughputs.

However, SINRs before pairing cannot be directly used as a determination criterion in pairing. Reasons are as follows: on one hand, in order to solve the problem that interference at a time of the user measurement is different from interference at a time of the actual scheduling by the base station, the base station may perform pre-scheduling to perform multi-user pairing assumptions; on the other hand, SINRs involve both inter-cell interference and intra-cell interference, and intra-cell interference suffered by the user equipment may change significantly due to pairing objects when multi-user pairing is performed by the base station.

In view of this, in embodiments of the present disclosure, preferably, the base station may firstly configure inter-cell resources for the user equipment; then configure intra-cell resources for the user equipment based on the information indicating inter-cell interference (also referred to as the first interference information) which is fed back based on the inter-cell resource configuration by the user equipment; and then determine transmission resource configurations of the user equipment based on the information indicating intra-cell interference (also referred to as the second interference information) which is fed back based on the intra-cell resource configuration by the user equipment (i.e., determining a multi-user pairing strategy). Through such hierarchical pre-scheduling, the problem of the rapidly increased system overhead during multi-user pairing due to the increase of the number of user equipment in the conventional technology may be solved.

Figure 2:
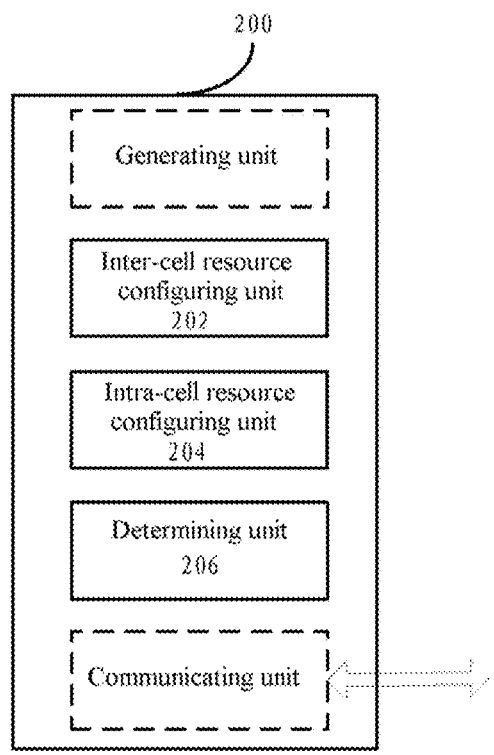
FIG. 2 is a block diagram illustrating an example of another functional configuration of an electronic device on a base station side in a wireless communication system according to an embodiment of the present disclosure.

The hierarchical pre-scheduling strategy of the base station is further described in detail below in conjunction with an example of another functional configuration of the electronic device shown in FIG. 2. FIG. 2 is a block diagram illustrating an example of another functional configuration of an electronic device on a base station side in a wireless communication system according to an embodiment of the present disclosure.

As shown in FIG. 2, an electronic device 200 according to the embodiment may include an inter-cell resource configuring unit 202, an intra-cell resource configuring unit 204 and a determining unit 206. Examples of functional configurations of the respective units are described in detail below.

The inter-cell resource configuring unit 202 may be configured to configure resources for measuring inter-cell interference for multiple user equipment. The resources configured for measuring the inter-cell interference may include one of channel state information-interference measurement (CSI-IM) resources, non-zero power channel state information-reference signal (NZP CSI-RS) resources and demodulation reference signal (DMRS) resources, wherein the CSI-IM resources generally refer to zero power channel state information-reference signal (ZP CSI-RS) resources.

Preferably, the inter-cell resource configuring unit 202 may configure inter-cell CSI-IM resources for multiple user equipment. Specifically, for any user equipment, inter-cell CSI-IM resources are configured at a port of the user equipment that corresponds to a neighboring cell transmission CSI-RS. That is, the power at a port of the user equipment that corresponds to a neighboring cell transmission CSI-RS is set to zero. Since the base station of the present cell has no transmission power at these ports, the user equipment may obtain the suffered inter-cell interference by measuring reception power P at these ports. With such an inter-cell resource configuration, complexity and processing overheads for the user equipment to measure the inter-cell interference may be reduced.

However, it should be understood that the inter-cell resource configuring unit 202 may also configure, for example, NZP CSI-RS resources, DMRS resources, and the like for the user equipment, so that the user equipment may also measure the inter-cell interference based on the corresponding reference signals, which is not limited in the present disclosure.

The intra-cell resource configuring unit 204 may be configured to configure resources for measuring intra-cell interference for multiple user equipment based on the information indicating inter-cell interference which is fed back by the multiple user equipment.

Figure 3:
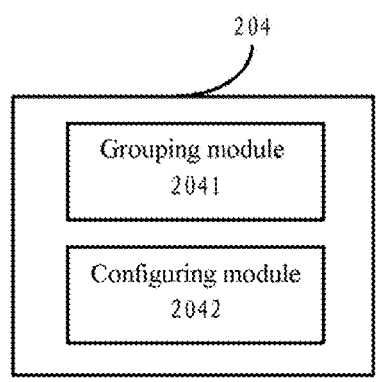
FIG. 3 is a block diagram illustrating an example of a functional configuration of an intra-cell resource configuring unit according to an embodiment of the present disclosure.

An example of a functional configuration of the intra-cell resource configuring unit is described in detail below in conjunction with FIG. 3. FIG. 3 is a block diagram illustrating an example of a functional configuration of an intra-cell resource configuring unit according to an embodiment of the present disclosure.

As shown in FIG. 3, the intra-cell resource configuring unit 204 may include a grouping module 2041 and a configuring module 2042.

The grouping module 2041 may be configured to determine, based on the information indicating inter-cell interference fed back by the multiple user equipment, one or more user pool(s) in which the multiple user equipment are located. It is to be noted that, in fact, the "user pool(s)" described here are not physically divided, but are logically divided based on inter-cell interference of the user equipment.

Specifically, the grouping module 2041 may compare the information indicating inter-cell interference fed back by the multiple user equipment with multiple preset thresholds, and determine user pools in which respective user equipment are located based on the ranges where respective inter-cell interference information is located.

For example, if the information indicating inter-cell interference which is fed back indicates the reception power, then the multiple preset thresholds may be multiple power thresholds P1 to Pn. These power thresholds may be set and adjusted based on inter-cell interference conditions and transmission powers of the base station of the present cell. Then, the grouping module 2041 may determine, based on the received reception power and the preset power thresholds, which one of the power ranges [0, P1), [P1, P2), . . . [Pn-1, Pn] in which the reception power fed back by respective user equipment is located. Each range may correspond to one user pool, and the base station may thus determine a user pool in which the respective user equipment is located. If the reception power P fed back by the user equipment is not in any of the power ranges, that is, P>Pn, then the grouping module 2041 may determine that this user equipment does not belong to any of the user pools, so that the grouping module does not treat this user equipment as the user equipment to be paired and performs single-user transmission for this user equipment. The reason is as follows: inter-cell interference suffered by this user equipment is high, and if this user equipment is paired with other user equipment, the other user equipment may be significantly interfered, thereby degrading the system performance.

Preferably, in order to reduce signaling overheads caused by the user equipment feeding back inter-cell interference information, the electronic device 200 may further include a generating unit (which is optional and is denoted by a dashed block in FIG. 2). The generating unit may be configured to generate information indicating a magnitude range of inter-cell interference. The information may be sent to the multiple user equipment so that the multiple user equipment may feed back, based on the information, the information indicating respective magnitude ranges in which the respective inter-cell interference is located, as the information indicating respective inter-cell interference. As an example, as described above, in the case that the resources configured for measuring inter-cell interference are CSI-IM resources, the generated information indicating magnitude ranges of inter-cell interference may be information indicating respective power ranges, for example, the above mentioned power thresholds P1 to Pn. Then, the base station may notify the user equipment of respective power thresholds P1 to Pn generated by the generating unit via, for example, radio resource control (RRC) signaling. Alternatively, the power thresholds may be notified via MAC layer signaling, physical layer signaling, or the like. However, since power thresholds do not change frequently and involve a relatively stable configuration, the notification may be realized, preferably, via the RRC signaling with a long period, so as to save the MAC layer signaling and the physical layer signaling both of which have limited resources. In this way, the user equipment may determine the power ranges of the measured reception powers P by comparing the measured reception powers P with the received power thresholds P1 to Pn, and may generate, based on the correspondence between the power ranges and the user pools, a bit sequence indicating the user pool in which the user equipment is located, as the information indicating inter-cell interference suffered by the user equipment.

In another aspect, if the user equipment finds, through the measurement and the comparison, that its own reception power P is greater than the power threshold Pn, that is, the user equipment does not belong to any of the user pools, then it is unnecessary for the user equipment to feed back any information to the base station. In this way, the base station may determine to perform single-user transmission for the user equipment from which no feedback information is received.

As can be seen, since the bit sequence indicating the user pool in which the user equipment is located corresponds to inter-cell interference suffered by the user equipment, the base station may obtain, based on the bit sequence, inter-cell interference conditions suffered by the user equipment. Furthermore, the information indicating inter-cell interference is fed back in a form of bit sequence, such that feedback signaling overheads of the user equipment can be substantially reduced.

The configuring module 2042 may be configured to configure, for the multiple user equipment, the resources for measuring intra-cell interference in a unit of per user pool.

According to an embodiment of the present disclosure, after the grouping module 2041 determines, based on inter-cell interference suffered by the user equipment, user pools in which the respective user equipment are located, the configuring module 2042 may configure intra-cell resources in a unit of per user pool. In this way, for any user equipment, the range of multi-user pairing assumptions is reduced from an entire cell to the user pool in which the user equipment is located, so that system overheads are reduced to a certain extent. In addition, since inter-cell interference suffered by the user equipment in each user pool is in the same range, user equipment whose SINRs differ greatly may be prevented from being paired together, thereby ensuring the system performance.

In the case that there is a large number of user equipment in user pools, in order to further reduce system overheads caused by multi-user pairing assumptions, the user equipment in the user pools may be grouped based on geographic location information of the user equipment in respective user pools, so as to further reduce the range of multi-user pairing assumptions.

Preferably, the grouping module 2041 may be further configured to divide, for each user pool, the user pool into one or more candidate group(s) based on number and location information of the user equipment in the user pool. The configuring module 2042 may be further configured to configure, for the user equipment, resources for measuring intra-cell interference in a unit of per candidate group.

As a preferable example, in order to reduce complexity and processing overheads for the user equipment to measure interference, the resources for measuring intra-cell interference configured for each user equipment may include non-zero power channel state information-reference signal (NZP CSI-RS) resources configured at a port corresponding to that user equipment and channel state information-interference measurement (CSI-IM) resources configured at ports corresponding to other user equipment in a candidate group in which that user equipment is located. In this way, for any user equipment, since transmission powers at the ports corresponding to other user equipment in the candidate group are set to be zero (i.e., configured with CSI-IM resources), the user equipment may just measure the reception powers at the corresponding ports to determine interference conditions among the user equipment corresponding to the ports, thereby greatly reducing processing overheads caused by interference measurement.

Figure 4:
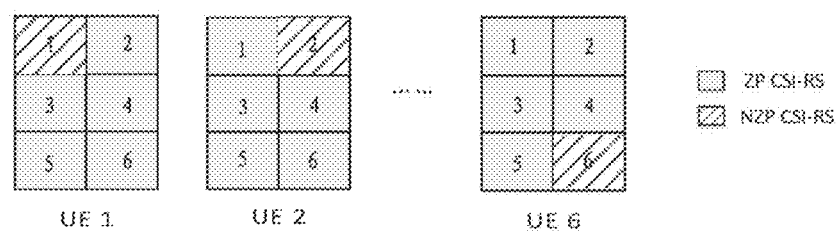
FIG. 4 is a schematic diagram illustrating an example of an intra-cell resource configuration in a candidate group according to an embodiment of the present disclosure.

FIG. 4 is a schematic diagram illustrating an example of an intra-cell resource configuration in a candidate group according to an embodiment of the present disclosure. It is to be noted here that the schematic diagram of intra-cell resource configuration shown in FIG. 4 is only for the convenience of describing a user equipment-specific intra-cell resource configuration in a candidate group, rather than indicating the actual port division or resource configurations at all ports of the user equipment.

As shown in FIG. 4, it is assumed that the candidate group includes six user equipment UE1 to UE6, and ports 1 to 6 correspond to UE1 to UE6 respectively. With respect to UE1, NZP CSI-RS resources are configured at port 1, while CSI-IM (i.e., ZP CSI-RS) resources are configured at the other ports, i.e. ports 2 to 6. With respect to UE2, NZP CSI-RS resources are configured at port 2, while CSI-IM (i.e., ZP CSI-RS) resources are configured at the other ports, i.e. port 1 and ports 3 to 6. And so forth, intra-cell resources are configured, in a unit of per candidate group, for each user equipment included in the candidate group, that is, each of the candidate groups has a specific intra-cell resource configuration. In this way, for any user equipment, since transmission powers at the ports corresponding to other user equipment in the candidate group are all set to zero, the user equipment may just measure the reception powers at the corresponding ports, thus measuring or obtaining the intra-cell interference between the user equipment and the other user equipment. For example, taking UE1 shown in FIG. 4 as an example, UE1 obtains the mutual interference between UE1 and UE2 when they are paired (i.e., when they share time frequency resources) by measuring a reception power at port 2 of UE1, and obtains the mutual interference between UE1 and UE3 when they are paired by measuring a reception power at port 3 of UE1, and so forth.

It should be understood that the intra-cell resource configuration in a candidate group as shown in FIG. 4 is only a preferred example, rather than a limitation. Moreover, a person skilled in the art may conceive of other resource configurations provided that the user equipment may measure or obtain intra-cell interferences in a condition of pairing with different user equipment.

In addition, it should be noted that the resource configuration in which resources are configured at six ports of each user equipment as shown in FIG. 4 is intended to indicate a case in which the candidate group includes six user equipment and each of the user equipment needs to presumptively pair with the other user equipment in the candidate group, rather than indicating that each user equipment actually includes only six ports. Instead, resources may be configured at more or less ports of each user equipment based on the actual configuration of candidate groups and the objects of pairing assumptions.

Determination on candidate groups is described in detail below. Specifically, for each user pool, if the number of user equipment is smaller than or equal to a preset threshold, the grouping module 2041 may not further divide the user pool, but set the user pool as a candidate group to configure intra-cell resources. Since the configuring module 2042 configures intra-cell resources in a unit of per candidate group, the value of the preset threshold may be determined based on, for example, the amount of resources that can be allocated to each candidate group by the base station.

In another aspect, if the number of user equipment in the user pool is greater than the preset threshold so that the system overheads are relatively large or the required amount of resources exceeds the amount of resources that may be allocated by the system, then the grouping module 2041 may further divide the user equipment in the user pool into multiple regions based on geographic location information of the user equipment in the user pool, and set each predetermined number of regions among the multiple regions as a candidate group. As a preferred example, in each user pool, user equipment geographically close to each other may be divided into a region, and the number of user equipment in each of the regions should be substantially equal.

Figure 5A:
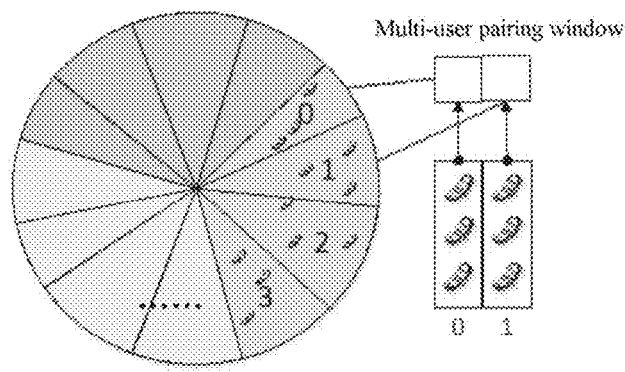
FIG. 5A and FIG. 5B are schematic diagrams illustrating an example for dividing regions and determining candidate groups in user pools according to an embodiment of the present disclosure.
Figure 5B:
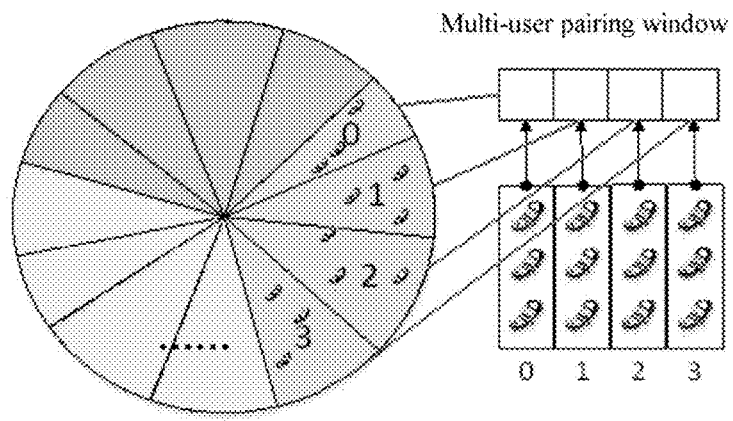

Examples for dividing regions and determining candidate groups for the user equipment in user pools according to an embodiment of the present disclosure are described in detail below with reference to FIG. 5A and FIG. 5B. It is to be noted here that solid lines denoting edges of respective regions in FIG. 5A and FIG. 5B are only for indicating region divisions of user equipment, but are not in existence actually. Moreover, region division may be adjusted by the base station based on the actual pairing requirements. For example, assuming that the number of the user equipment in the user pool is 12, if pairing is to be performed for two user equipment, the user equipment may be divided, based on geographic locations of the user equipment, into 4 regions, namely region 0, region 1, region 2 and region 3, and the number of user equipment in each region is 3. In another aspect, for example, if pairing is to be performed for three user equipment, the user equipment may be divided, based on geographic locations of the user equipment, into 3 regions, namely region 0, region 1 and region 2, and the number of the user equipment in each region is 4.

As shown in FIG. 5A, it is assumed a case in which pairing is to be performed for two user equipment, that is, it is assumed that identical time frequency resources are to be configured for two user equipment to perform MU-MIMO transmission: the number of user equipment in the user pool is 12, the user equipment being divided, based on geographic locations of the user equipment, into 4 regions, namely region 0, region 1, region 2 and region 3, wherein the number of user equipment in each region is 3. In this case, two regions may be taken as one candidate group to perform pairing assumptions. For example, preferably, two neighboring regions may be taken as one candidate group, that is, region 0 and region 1 are taken as a candidate group, and region 2 and region 3 are taken as a candidate group. The reason is as follows: distances between user equipment in neighboring regions are moderate, and pairing of such user equipment would not result in pairing of user equipment with an excessively small distance which leads to overlarge mutual interference, or pairing of user equipment with an excessively long distance which leads to the failure of allocated common time frequency resources in covering all the paired user equipment (e.g., in the case of beamforming, width of the same allocated beam may not cover all the paired user equipment). Yet, this is only a preferred example, rather than a limitation, and the determination regarding the candidate groups may be adjusted according to actual needs. For example, the region 0 and the region 2 may be taken as a candidate group, while the region 1 and the region 3 may be taken as a candidate group, and the like, which is not specifically limited in this disclosure.

It should be noted that, preferably, for the user equipment in each region, pairing assumptions are only performed with other user equipment in other regions of the candidate group in which said user equipment is located. The reason is that user equipment in the same region may have high mutual interference due to an excessively small distance therebetween. Thus, preferably, such user equipments are not paired together. In other words, during configuring intra-cell resources, preferably, the resources for measuring intra-cell interference configured for each user equipment may include NZP CSI-RS resources configured at a port corresponding to that user equipment and CSI-IM resources configured at ports corresponding to user equipment in regions other than the region in which that user equipment is located, within the candidate group in which that user equipment is located.

Specifically, still taking the case shown in FIG. 4 as an example, it is assumed that the candidate group includes six user equipment UE1 to UE6, wherein the user equipment UE1 to UE3 belong to the same region, and the user equipment UE4 to UE6 belong to the same region. In this case, since each of the user equipment only needs to presumptively pair with user equipment in other regions of the candidate group, in fact, resources are only configured at four ports of the user equipment during the intra-cell resource configuration. Specifically, taking UE1 as an example, and referring to FIG. 4, since UE1 only needs to presumptively pair with UE4 to UE6 in the other region, NZP CSI-RS resources may be configured at port 1 corresponding to UE1, and ZP CSI-RS resources may be configured at port 4 to port 6 corresponding to UE4 to UE6. As a result, UE1 can obtain intra-cell interference in pairing with UE4 to UE6 respectively just by measuring receptions powers at the corresponding ports, i.e. port 4 to port 6. In this case, it is unnecessary to configure resources at port 2 and port 3 of UE1 that correspond to UE2 and UE3. In other words, UE1 may be provided with no ports corresponding to UE2 and UE3 in this case. Resource configurations at ports of UE2 and UE6 are similar to those of UE1, which are not described in detail here.

In this way, system overheads for pairing assumptions may be further reduced. Specifically, taking FIG. 5A as an example, in the case where no region division is performed, the number of pairing assumptions for each user equipment in the user pool is 11. After region division is performed as shown in FIG. 5A, the number of pairing assumptions for each user equipment in each region is reduced to 3. Thus, for a system, the number of possible combinations of multi-user pairing assumptions made for the 12 user equipment in the user pool is reduced from 12*11=132 to 3*3+3*3=18.

As another example, FIG. 5B schematically illustrates an example in which pairing of four user equipment is performed. As shown in FIG. 5B, as an example, the number of user equipment in the user pool is still 12, and the user equipment may be divided into 4 regions, namely region 0, region 1, region 2 and region 3, wherein the number of user equipment in each region is 3. In the case of pairing four user equipment together, such four regions may be taken as one candidate group, and each time one user equipment is selected from each of the four regions to perform pairing assumptions. In this case, intra-cell resource configurations for respective user equipment follows the same principle as the one described with reference to FIG. 4, which is not described in detail here. In this case, for a system, the number of possible combinations of multi-user pairing assumptions for the 12 user equipment in the user pool is reduced from 12*11*10*9=11880 to 3*3*3*3=81. As can be seen, in a case that the number of user equipment to be paired is large, system overheads can be significantly reduced with a multi-user pairing strategy according to an embodiment of the present disclosure.

Moreover, it is to be noted that the region dividing and the candidate group determining as shown in FIG. 5A and FIG. 5B are only exemplary, rather than a limitation. A person skilled in the art may properly divide the regions and determine the candidate groups based on the principle of the disclosure in combination with the actual situations. Furthermore, such variations should also be deemed to fall within the scope of the present disclosure.

According to the above embodiment of the present disclosure, the base station may perform the following operations: firstly, configuring inter-cell resources for user equipment; then dividing the user equipment into one or more user pool(s) based on inter-cell interference information fed back based on inter-cell resource configurations by the user equipment; further dividing the user equipment in a user pool into one or more candidate group(s) based on number and location information of the user equipment in the user pool; configuring intra-cell resources in a unit of per candidate group; determining an intra-cell user equipment pairing scheme, based on the intra-cell interference information which is fed back based on the intra-cell resource configuration by the user equipment; and performing the corresponding transmission resource configuration. As can be seen, in fact, the pre-scheduling of the base station includes two stages, that is, inter-cell resource configuration as the first stage of pre-scheduling and intra-cell resource configuration as the second stage of pre-scheduling. Thus, by performing the hierarchical pre-scheduling, system overheads caused by multi-user pairing assumptions may be significantly reduced, while a balance between system fairness and throughputs may be ensured.

Preferably, if some user equipment in a cell is already in a paired state, it is unnecessary to implement hierarchical pre-scheduling described above for such user equipment, and such user equipment may not feed information regarding the suffered inter-cell interference and intra-cell interference back to the base station. In a case that service quality of the user equipment cannot meet the predetermined requirements, for example, if quality of service (QoS) values of the user equipment are below the preset threshold, or if data transmission fails frequently, the base station may stop current pairing for the user equipment and perform the above-mentioned hierarchical pre-scheduling to conduct user equipment pairing again (i.e., reallocating transmission resources for the user equipment) or perform single-user transmission for the user equipment.

The technology according to the embodiment of the present disclosure is especially useful in solving a problem that system overheads caused by pairing assumptions rapidly increase due to a large number of user equipment to be paired in the system. However, in the case that the number of user equipment to be paired in the system is small, overheads saved through implementing solutions according to the present disclosure are limited, and interference information fed back twice from the user equipment to the base station may also occupy a part of the system resources. Therefore, in this case, instead of performing solutions according to the present disclosure, existing multi-user pairing solutions in the conventional technology may be adopted to perform pairing assumptions for the entire system. For this reason, preferably, a threshold may be set in advance. The base station may switch between the existing pairing solution and the pairing solution according to the present disclosure based on the number of user equipment to be paired, so as to acquire the optimal comprehensive system performance. Specifically, for example, in a case that the number of user equipment to be paired is smaller than or equal to the threshold, the existing pairing solution may be implemented, and in a case that the number of user equipment to be paired is greater than the threshold, the base station may implement a pairing solution according to the present disclosure to reduce system overheads.

It should be understood that as preferred examples, it is described above a case in which the base station firstly performs inter-cell resource configurations to acquire inter-cell interference information. However, the relevant process, i.e. the process of configuring intra-cell resources based on inter-cell interference information to acquire intra-cell interference information and then determining the final multi-user pairing scheme based on the intra-cell interference information, is performed in view of a fact that usually, inter-cell interference suffered by the user equipment is relatively stable while intra-cell interference may significantly change as objects of pairing change. Thus, inter-cell resource configuration is firstly performed as the first-stage pre-scheduling, and then intra-cell resource configuration is performed as the second-stage pre-scheduling, such that it can be ensure that the user equipment with similar SINRs may be paired together where possible, thus achieving a balance between system fairness and throughputs. However, according to a specific system environment, in fact, the intra-cell resources may be firstly configured as the first stage of pre-scheduling, and the inter-cell resources be then configured as the second stage of pre-scheduling, a sequence of which is not limited in the present disclosure.

It should be noted that the electronic devices 100 and 200 described above may be implemented at a chip level, or may be implemented at a device level by including other peripheral components. For example, the electronic devices 100 and 200 may operate as base stations as complete machine, and include a communicating unit (which is optional and is denoted by a dashed block) to implement the communication with a peripheral device. For example, the communicating unit may be used to implement communication with the user equipment, including notifying the user equipment of the above power thresholds, inter-cell resource configuration information, intra-cell resource configuration information and the like, and receiving the information indicating inter-cell interference, the information indicating intra-cell interference, and the like that are fed back by the user equipment. In addition, it should be noted that the specific implementation of the communicating unit is not limited here, and it may include one or more communication interface(s) for supporting communication with different peripheral devices.

Corresponding to the embodiment of the electronic device on the base station side, an example of a functional configuration of an electronic device on a user equipment side is described below.

(2. Electronic Device on a User Equipment Side in a Wireless Communication System According to an Embodiment of the Present Disclosure)

Figure 6:
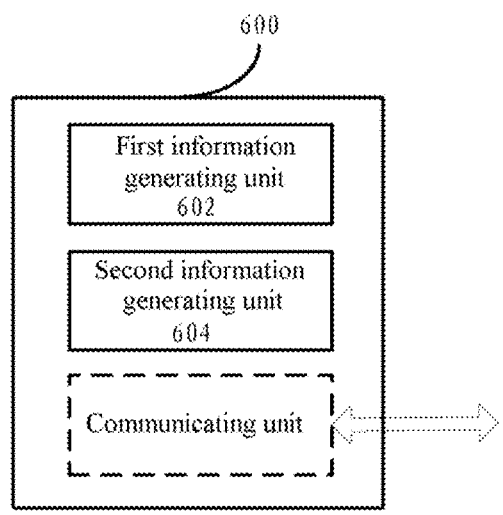
FIG. 6 is a block diagram illustrating an example of a functional configuration of an electronic device on a user equipment side in a wireless communication system according to an embodiment of the present disclosure.

FIG. 6 is a block diagram illustrating an example of a functional configuration of an electronic device on a user equipment side in a wireless communication system according to an embodiment of the present disclosure.

As shown in FIG. 6, an electronic device 600 according to the embodiment may include a first information generating unit 602 and a second information generating unit 604.

The first information generating unit 602 may be configured to generate, based on inter-cell resource configurations of a base station, information indicating inter-cell interference suffered by the user equipment, wherein the information is to be fed back to the base station.

Preferably, as described above, the base station may configure inter-cell CSI-IM resources at a port of the user equipment corresponding to a neighboring cell, that is, transmission power of a port corresponding to a neighboring cell is set to zero, such that the first information generating unit 602 may generate, by measuring the reception power at the corresponding port, the information indicating inter-cell interference suffered by the user equipment.

Moreover, preferably, in order to save signaling overheads caused by the user equipment feeding back inter-cell interference information, the base station may also notify in advance the user equipment of the information indicating magnitude ranges of the inter-cell interference via, for example, RRC signaling. In this way, the first information generating unit 602 may further generate, based on the measured inter-cell interference and the received information on the magnitude range, information indicating the magnitude range in which the inter-cell interference is located, as the information indicating the inter-cell interference, which is to be fed back to the base station. If the measured inter-cell interference does not fall within any of the magnitude ranges, the first information generating unit 602 may generate no information indicating the inter-cell interference thereof. In this way, for the user equipment from which no feedback information is received, the base station may determine that the interference suffered by that user equipment is excessively high and it is inappropriate for that user equipment to share transmission resources with other user equipment, and thus single-user transmission may be performed for that user equipment.

In addition, preferably, the information indicating magnitude ranges of inter-cell interference may be power thresholds P1 to Pn described above. Therefore, the first information generating unit 602 may determine power ranges in which reception powers at the corresponding ports are located, and generate the information indicating power ranges with respect to the user equipment (e.g., the binary bit sequence M described above), as the information indicating inter-cell interference suffered by the user equipment.

Furthermore, the first information generating unit 602 may generate, based on the magnitude range in which the inter-cell interference suffered by the user equipment is located and correspondence between the magnitude ranges and the user pools, the information indicating a use pool in which the user equipment is located, as the information indicating inter-cell interference. The information indicating the user pool in which the user equipment is located may be preferably in a form of a binary bit sequence M. It is assumed that the number of user pools in a cell is represented by n, wherein n may be determined based on the information such as capability of a system to perform multi-user pairing. The length of the binary bit sequence M may be then expressed by $\log_2(n)$. Tab. 1 below illustrates an exemplary form of the binary bit sequence M in a case of n=4.

TABLE 1

An Exemplary Form of the Binary Bit Sequence M

| M | 00 | 01 | 10 | 11 |
|---|---|---|---|---|
| Meaning | User Pool 1 | User Pool 2 | User Pool 3 | User Pool 4 |

As can be seen, the information indicating inter-cell interference suffered by the user equipment is fed back in a form of the binary bit sequence M indicating the user pool in which the user equipment is located, and thus feedback signaling overheads of the user equipment can be substantially reduced. Moreover, it should be understood that the serial number of the user pool in which the user equipment is located is represented by the binary bit sequence M for the convenience of visual expression. In fact, M substantially indicates the magnitude range to which the inter-cell interference suffered by the user equipment belongs, which is also the basis for logically dividing the user equipment into respective user pools.

In another aspect, user equipment which is under pairing (i.e., which is sharing time frequency resources with other user equipment) does not generate or feed back the information (e.g., signal M) indicating the user pool in which the user equipment is located. In a case that service quality (e.g., a QoS value) of the user equipment cannot meet relevant requirements or data transmission fails frequently, this user equipment may generate information that reflects inter-cell interference of this user equipment by the first information generating unit 602 and feed back the information to the base station, so as to request the base station to reallocate transmission resources for this user equipment, which includes determining whether or not this user equipment needs to share transmission resources with other user equipment, with which of the user equipment this user equipment shares transmission resources, and the like.

It is to be noted that specific forms of the information indicating inter-cell interference generated by the first information generating unit 602 are not limited herein, as long as the information can reflect the inter-cell interference suffered by the user equipment and reduce signaling overheads as much as possible. As an example, the information indicating inter-cell interference generated by the first information generating unit 602 may be in a form of single user-channel quality indicator (SU-CQI) measured in this case, and the user equipment can feed the information back to the base station in a form of SU-CQI.

The second information generating unit 604 may be configured to generate, based on intra-cell resource configurations of the base station, information indicating intra-cell interference suffered by the user equipment, and the information is to be fed back to the base station, so that the base station may determine transmission resource configurations with respect to the user equipment based on the information indicating inter-cell interference and the information indicating intra-cell interference. Specifically, based on, for example, intra-cell resource configurations described with reference to FIG. 4, the second information generating unit 604 may generate, by measuring reception powers at the corresponding ports, intra-cell interference information in the case that pairing assumptions are performed with respective user equipment in the candidate group.

As a preferred example, the information indicating intra-cell interference generated by the second information generating unit 604 may be in a form of multiple user-channel quality indicator (MU-CQI) measured in this case, or information on a difference between the single user-channel quality indicator (SU-CQI) and the MU-CQI measured at that time (i.e., ΔCQI=SU-CQI-MU-CQI). It should be noted that the SU-CQI described herein may be SU-CQI which is measured during single-user transmission performed by the base station for the user equipment and saved in advance, or may be SU-CQI generated by the above first information generating unit 602 (i.e., the SU-CQI measured during measuring the inter-cell interference). In this way, the user equipment may feed back intra-cell interference information to the base station in a form of MU-CQI or ΔCQI (=SU-CQI-MU-CQI). As a channel quality indicator (CQI) corresponds to an SINR and occupies a low signaling overhead, determination on pairing schemes of the user equipment based on a CQI value fed back by the user equipment leads to a result that user equipment of similar SINRs are paired together. In other words, identical time frequency resources are allocated for such user equipment to perform MU-MIMO transmission while signaling overheads are saved. Thus, based on measurement information (e.g., MU-CQI or ΔCQI) in different pairing assumptions fed back by the user equipment, the base station may select the user equipment pairing scheme with the optimal pre-scheduling effect to perform MU-MIMO transmission. It may be understood that in the case that the measurement information is fed back in a form of ΔCQI, feedback overheads may be further reduced.

It is to be noted here that specific forms of the information indicating intra-cell interference generated by the second information generating unit 604 are not limited herein, as long as they reflect SINRs of the user equipment in different pairing schemes.

The electronic device on the user equipment side described here corresponds to the embodiment of the electronic device on the base station side as described above. Therefore, for the contents not described in detail here, reference may be made to the corresponding description above, which is not repeated here.

It should be noted that the electronic device 600 herein may be implemented at a chip level, or may be implemented at a device level by including other peripheral components. For example, the electronic device 600 may operate as a user equipment as a complete machine, and include a communicating unit (which is optional and is denoted by a dashed block) for performing data transceiving operations with an external device. For example, the communicating unit may be used to implement communication with the base station, including receiving power thresholds P1 to Pn, inter-cell resource configuration information and intra-cell resource configuration information from the base station, and feeding inter-cell interference information, intra-cell interference information, and the like to the base station. In addition, it should be further noted that the specific implementation of the communicating unit is not limited here, and it may include one or more communication interface(s) for realizing communication with different peripheral devices.

It should be further noted that the various functional units and modules described above are merely logical modules divided according to the specific functions thereof, and are not intended to limit the specific implementations. In the actual implementation, the above functional units and modules may be implemented as separated physical entities, or may be implemented as a single entity (e.g., a processor (CPU, DSP or the like), an integrated circuit or the like).

In addition, it should be noted that although the device embodiments of the present disclosure are described above with reference to functional block diagrams shown in FIGS. 1 to 3 and FIG. 6, these are exemplary rather than restrictive. A person skilled in the art may modify the shown functional configuration examples according to the principle of the present disclosure. For example, functional modules in various embodiments may be added, deleted, modified, combined or the like, and all of such modifications are considered to fall within the scope of the present disclosure.

[3. Signaling Interaction Process for Implementing a Multi-User Pairing Strategy According to an Embodiment of the Present Disclosure]

Figure 7:
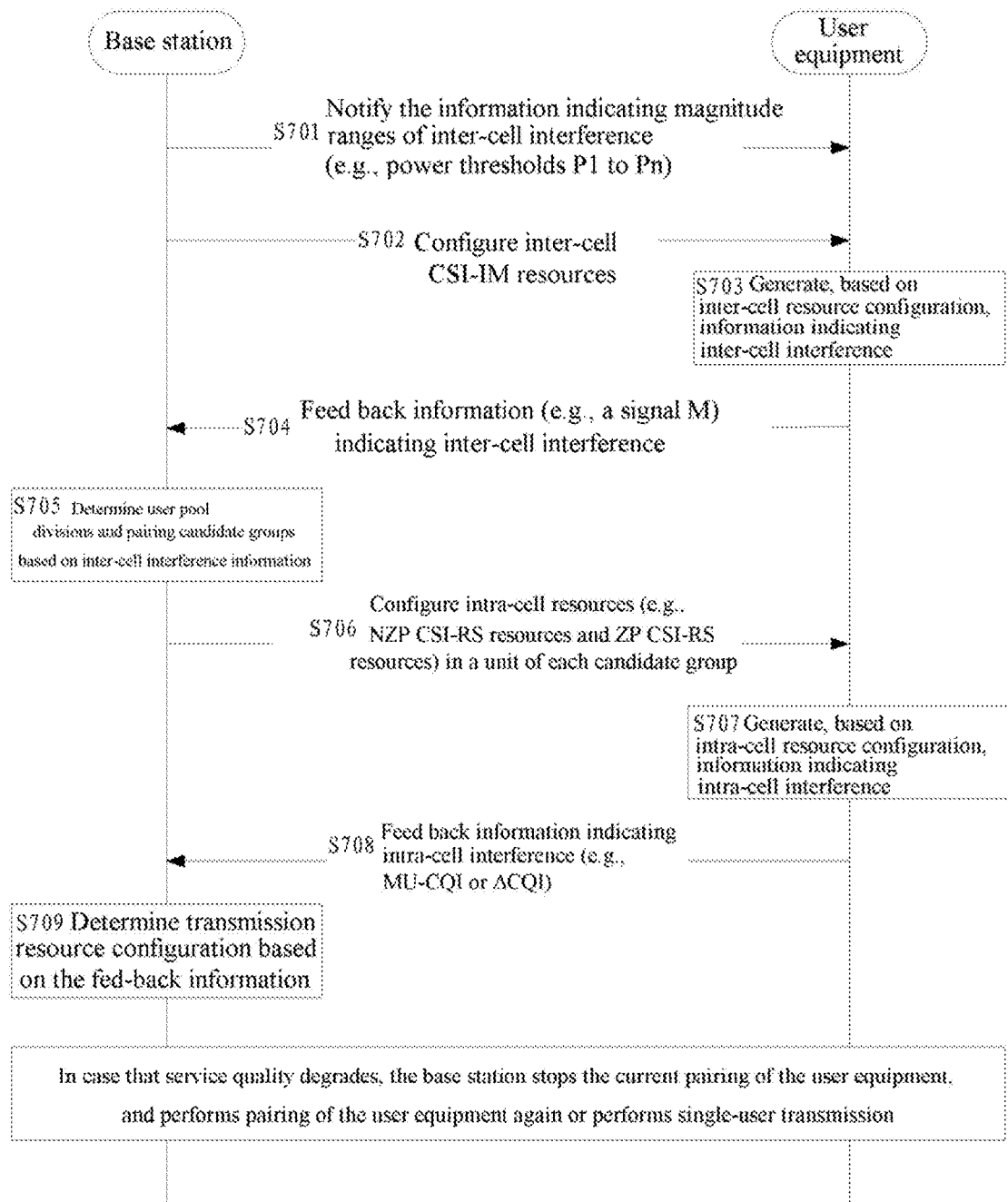
FIG. 7 is a flow diagram illustrating an example of a signaling interaction process for implementing a multi-user pairing strategy according to an embodiment of the present disclosure.

In order to further facilitate understanding of the operation principle of the technology according to the present disclosure, a signaling interaction process for implementing a multi-user pairing strategy according to an embodiment of the present disclosure will be described below with reference to a flow diagram shown in FIG. 7. FIG. 7 is a flow diagram illustrating an example of a signaling interaction process for implementing a multi-user pairing strategy according to an embodiment of the present disclosure.

As shown in FIG. 7, firstly, in step S701, the base station notifies, through, for example, RRC signaling, MAC layer signaling or physical layer signaling, the user equipment of the information (e.g., power thresholds P1 to Pn) indicating magnitude ranges of inter-cell interference, and then in step S702, the base station configures inter-cell CSI-IM resources for the user equipment. Subsequently, in step S703, the user equipment generates, based on the inter-cell resource configurations, the information indicating inter-cell interference. Specifically, for example, the power P at the port corresponding to a neighboring cell is measured and compared with power thresholds. Comparison results are then mapped to a bit sequence M indicating the user pool in which the user equipment is located. Next, in step S704, the user equipment feeds the generated bit sequence M, as the information indicating inter-cell interference, back to the base station. In step S705, the base station determines, based on the received signal M, the user pool in which the user equipment is located, and further divides the user pool into one or more candidate group(s) based on number and location information of the user equipment in the user pool. Subsequently, in step S706, the base station configures intra-cell resources (including NZP CSI-RS resources at the port corresponding to the user equipment itself and ZP CSI-RS resources at the ports corresponding to other user equipment in the candidate group) for the user equipment in a unit of per candidate group. Then, in step S707, the user equipment generates, based on intra-cell resource configurations, the information, such as MU-CQI or ΔCQI, indicating intra-cell interference in different pairing assumptions, and in step S708, the user equipment feeds back the information to the base station. Then, in step S709, the base station may determine pairing schemes of the user equipment based on the measurement information fed back by the user equipment, that is to determine which user equipment need to share transmission resources.

After the pairing schemes are determined, the base station allocates the same time frequency resources for the user equipment paired together, so as to perform data transmission. In a case that service quality of any paired user equipment degrades to an extent that the user equipment cannot meet relevant requirements, the base station may stop pairing between the user equipment and other user equipment, and performs single-user transmission for the user equipment or re-determine pairing object(s) for the user equipment.

It should be understood that the signaling interaction process shown in FIG. 7 is only exemplary, rather than restrictive, and that it just schematically illustrates an exemplary implementation of a multi-user pairing solution according to the present application. A person skilled in the art can properly modify the above signaling interaction process according to the principle of the present disclosure in conjunction with the actual conditions, and apparently, all of such modifications shall be deemed to fall within the scope of the present disclosure. For example, the process of notification of power thresholds in step S701 may be omitted. In this case, the user equipment directly feeds its measured reception powers back to the base station, such that the base station divides the user pool based on such powers and the power thresholds. Thus, processing overheads of the user equipment may be reduced. However, feedback overheads thereof may be increased. As another example, if it is found through comparison by the user equipment in step S703 that the reception power thereof is higher than the threshold Pn, no feedback signal M is generated. As a result, signal M is not fed back to the base station in step S704.

Corresponding to the above device embodiment, a method in a wireless communication system according to an embodiment of the present disclosure is described below with reference to FIG. 8 and FIG. 9.

[4. Method on a Base Station Side in a Wireless Communication System According to an Embodiment of the Present Disclosure]

Figure 8:
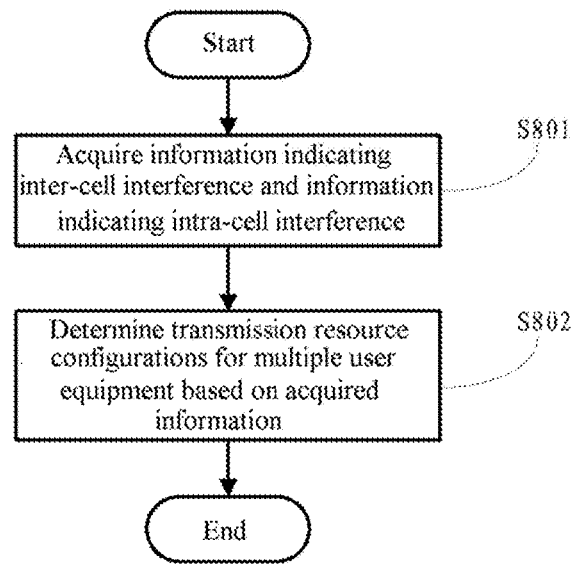
FIG. 8 is a flow diagram illustrating a process example of a method on a base station side in a wireless communication system according to an embodiment of the present disclosure.

FIG. 8 is a flow diagram illustrating a process example of a method on a base station side in a wireless communication system according to an embodiment of the present disclosure.

As shown in FIG. 8, the method starts at step S801. In step S801, the base station acquires the information indicating inter-cell interference and the information indicating intra-cell interference both of which are fed back by multiple user equipment.

Then, the method proceeds to step S802. In step S802, the base station determines, based on the information indicating inter-cell interference and the information indicating intra-cell interference which are acquired in step S801, transmission resource configurations regarding the multiple user equipment.

Preferably, the method may further include configuring resources for measuring inter-cell interference for the multiple user equipment. The resources configured for measuring inter-cell interference may include one of channel state information-interference measurement (CSI-IM) resources, non-zero power channel state information-reference signal (NZP CSI-RS) resources and demodulation reference signal (DMRS) resources.

Further, preferably, the method may further include: configuring, based on the information indicating inter-cell interference that is fed back by the multiple user equipment, resources for measuring intra-cell interference for the multiple user equipment. Specifically, based on the information indicating inter-cell interference that is fed back by the user equipment, user pools in which respective user equipment are located are determined. Then, one or more candidate group(s) in each user pool may be determined based on number and location information of the user equipment in respective user pools, and intra-cell resources may be configured in a unit of per candidate group.

For specific processes of implementing inter-cell resource configurations, user pool determination, candidate group determination and intra-cell resource configurations, reference may be made to the description of the corresponding portions in the above device embodiments, which are not repeated.

It should be noted that the method embodiment described here corresponds to the embodiment of an electronic device on the base station side described above with reference to FIGS. 1 to 5, and thus for the contents which are not described in detail here, reference may be made to the above description at the corresponding portions, which are not repeated.

[5. Method on a User Equipment Side in a Wireless Communication System According to an Embodiment of the Present Disclosure]

Figure 9:
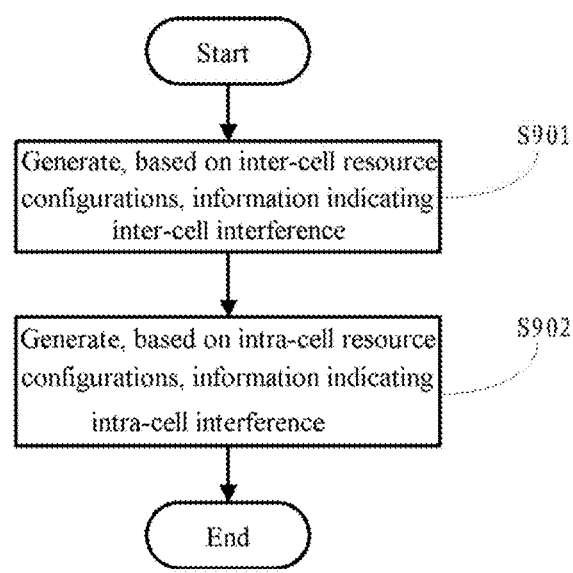
FIG. 9 is a flow diagram illustrating a process example of a method on a user equipment side in a wireless communication system according to an embodiment of the present disclosure.

FIG. 9 is a flow diagram illustrating a process example of a method on a user equipment side in a wireless communication system according to an embodiment of the present disclosure.

As shown in FIG. 9, the method starts at step S901. In step S901, the user equipment generates, based on inter-cell resource configuration of a base station, information indicating inter-cell interference suffered by the user equipment, and the information is to be fed back to the base station. Preferably, the user equipment may generate, by measuring a reception power at the corresponding port, the information indicating inter-cell interference. The information indicating the inter-cell interference may be in a form of a binary bit sequence M indicating the user pool in which the user equipment is located, so as to reduce feedback overheads. For specific procedures of generating and feeding back the information indicating inter-cell interference, reference may be made to the description of the corresponding portions in the above device embodiments, which is not repeated here.

Next, the method proceeds to step S902. In step S902, the user equipment generates, based on intra-cell resource configurations of the base station, the information indicating intra-cell interference suffered by the user equipment, and the information is to be fed back to the base station, so that the base station may determine transmission resource configurations with respect to the user equipment based on the information indicating inter-cell interference and the information indicating intra-cell interference. Specifically, the user equipment may generate, by measuring a reception power at the corresponding port, the information indicating intra-cell interference in different pairing assumptions. Preferably, the information indicating intra-cell interference may include one of MU-CQI, and a difference between MU-CQI and the SU-CQI saved in advance. For specific procedures of generating and feeding back the information indicating intra-cell interference, reference may be made to the description of the corresponding portions in the above device embodiments, which is not repeated here.

It should be noted that the method embodiment described here corresponds to the embodiment of an electronic device on the user equipment side described above with reference to FIG. 6, and thus for the contents which are not described in detail here, reference may be made to the above description at the corresponding portions, which are not repeated.

In addition, it should be understood that flow diagrams shown in above FIGS. 7 to 9 are exemplary, rather than restrictive. A person skilled in the art may modify the illustrated examples of the processing flows according to the principle of the present disclosure. For example, steps in various embodiments may be added, deleted, modified, combined or the like, and all of such modifications are considered to fall within the scope of the present disclosure.

It is to be understood that the storage medium and the machine-executable instructions in a program product according to an embodiment of the present disclosure may be configured to perform a method corresponding to the above device embodiments, and thus for the contents which are not described in detail here, reference may be made to the above description at corresponding portions, which are not repeated.

Accordingly, a storage medium for carrying the program product including the machine-executable instructions is also included in the present disclosure. The storage medium includes but is not limited to a floppy disk, an optical disk, a magneto-optical disk, a storage card and a memory rod.

[6. Computing Device for Implementing the Electronic Device and the Method According to the Present Disclosure]

Figure 10:
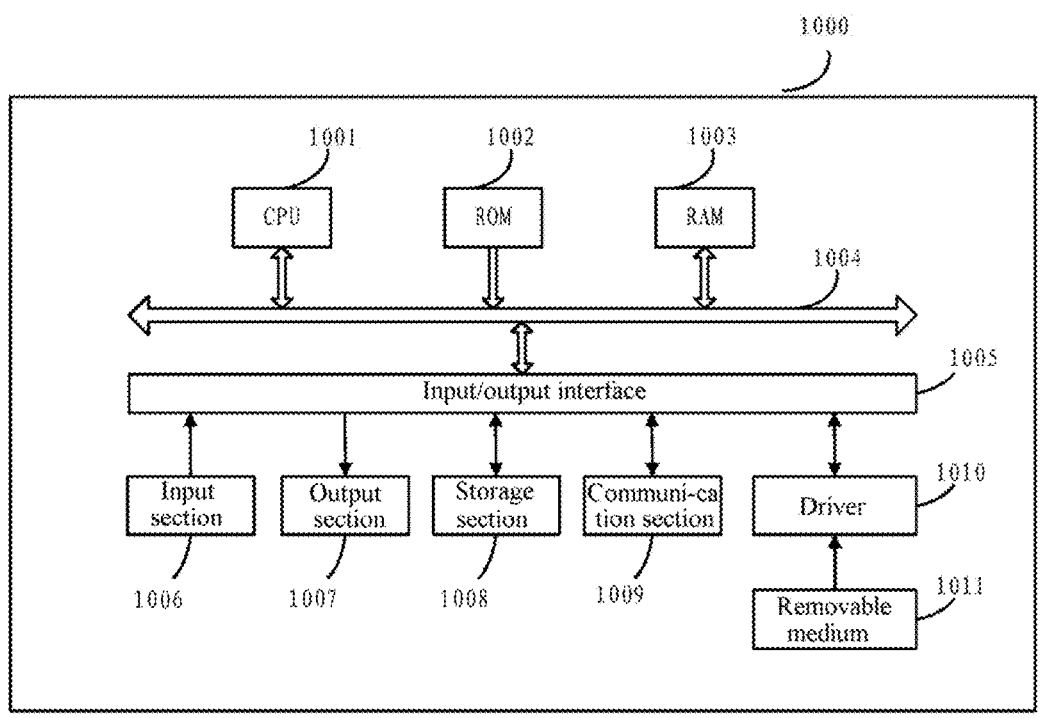
FIG. 10 is a block diagram illustrating an exemplary structure of a personal computer which can be used as an information processing device according to an embodiment of the present disclosure.

Furthermore, it should be further noted that the foregoing series of processes and devices may also be implemented in software and/or firmware. In the case of being implemented in software and/or firmware, a program constituting the software is installed from a storage medium or a network to a computer with a dedicated hardware structure, e.g., a general purpose personal computer 1000 illustrated in FIG. 10, which can perform various functions when various programs are installed thereon. FIG. 10 is a block diagram illustrating an exemplary structure of a personal computer which can be used as an information processing device according to an embodiment of the present disclosure.

In FIG. 10, a central processing unit (CPU) 1001 executes various processing based on the program stored in a read only memory (ROM) 1002 or the program loaded from the storage section 1008 to a random access memory (RAM) 1003. In the RAM 1003, the data required by a CPU 1001 to execute various processing is also stored as necessary.

The CPU 1001, the ROM 1002 and the RAM 1003 are connected with each other via a bus 1004. An input/output interface 1005 is also connected to the bus 1004.

The input/output interface 1005 is connected with an input section 1006 (including a keyboard, a mouse), an output section 1007 (including a display such as a cathode ray tube (CRT), a liquid crystal display (LCD), and a loudspeaker), a storage section 1008 (including a hard disk or the like), and a communication section 1009 (including a network interface card such as a LAN card, a modem or the like). The communication section 1009 executes communication processing via a network such as the Internet.

A driver 1010 may also be connected to the input/output interface 1005 as necessary. A removable medium 1011 such as a magnetic disk, an optical disk, a magneto-optical disk and a semiconductor memory is installed in the driver 1010 as needed, such that a computer program read from the removable medium may be installed in the storage section 1008 as necessary.

If the foregoing series of processing is implemented by software, a program constituting the software is installed from the network such as the Internet or a storage medium such as the removable medium 1011.

It should be understood by a person skilled in the art that the storage medium is not limited to the removable medium 1011 shown in FIG. 10 in which the program is stored and which is distributed separately from the device so as to provide the program to the user equipment. The removable medium 1011 may be, for example, a magnetic disc (including a floppy disc (registered trademark)), a compact disc (including a compact disc read-only memory (CD-ROM) and a digital versatile disc (DVD)), a magneto-optical disc (including a mini disc (MD) (registered trademark)), and a semiconductor memory. Alternatively, the storage medium may be a ROM 1002, a hard disk included in the storage section 1008, etc., which has a program stored therein and is distributed to the user along with an device in which they are incorporated.

[7. Application Examples of the Technology According to the Present Disclosure]

The technology of the present disclosure may be applied to various products including a base station and a user equipment. Specifically, the base station may be implemented as evolved Node B (eNB) of any type, such as a macro eNB and a small eNB. The small eNB may be an eNB such as a pico eNB, a micro eNB and a home (femto) eNB that covers a cell smaller than a macro cell. Alternatively, the base station may also be implemented as a base station of any other type, such as a NodeB and a base transceiver station (BTS). The base station may include a main body (which is also referred to as a base station device) configured to control wireless communication, and one or more remote radio head(s) (RRH) disposed in a different place from the main body. In addition, various types of terminals, which will be described below, may each operate as the base station by temporarily or semi-persistently executing a base station function.

The user equipment may be implemented as a mobile terminal (such as a smartphone, a tablet personal computer (PC), a notebook PC, a portable game terminal, a portable/dongle type mobile router, and a digital camera), or an in-vehicle terminal (such as a car navigation device). The user equipment may also be implemented as a terminal performing machine to machine (M2M) communication (which is also referred to as a machine-type communication (MTC) terminal). In addition, the user equipment may be a wireless communication module (such as an integrated circuit module including a single wafer) installed on each of the terminals described above.

Application examples according to the present disclosure are described below with reference to FIGS. 11 to 14.

(7-1. Application Examples Regarding the Base Station)

First Application Example

Figure 11:
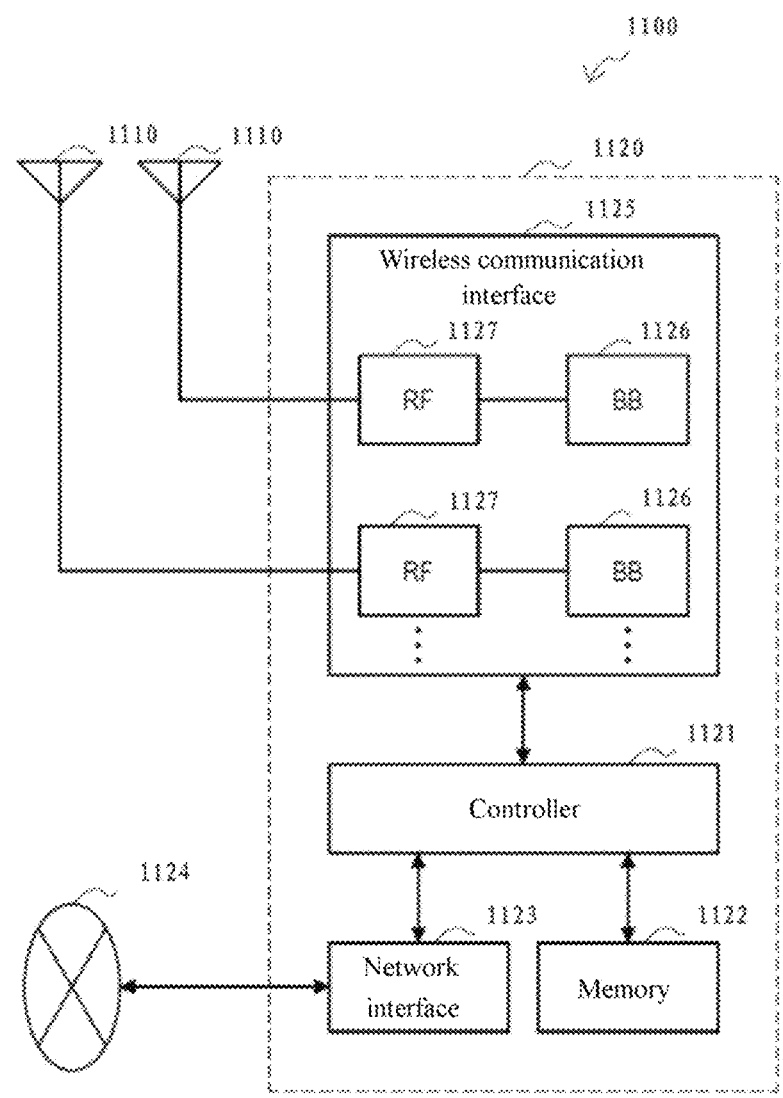
FIG. 11 is a block diagram illustrating a first example of a schematic configuration of an evolved Node (eNB) to which the technology of the present disclosure may be applied.

FIG. 11 is a block diagram illustrating a first example of a schematic configuration of an eNB in which the technology according to the present disclosure may be applied. An eNB 1100 includes one or more antenna(s) 1110 and a base station device 1120. The base station device 1120 and each antenna 1110 may be connected with each other via a RF cable.

Each of the antennas 1110 includes one or more antenna elements (such as multiple antenna elements included in a multi-input and multi-output (MIMO) antenna), and is used for the base station device 1120 to transmit and receive radio signals. The eNB 1100 may include the multiple antennas 1110, as shown in FIG. 11. For example, the multiple antennas 1110 may be compatible with multiple frequency bands used by the eNB 1100. Although FIG. 11 illustrates an example in which the eNB 1100 includes multiple antennas 1110, the eNB 1100 may also include a single antenna 1110.

The base station device 1120 includes a controller 1121, a memory 1122, a network interface 1123, and a wireless communication interface 1125.

The controller 1121 may be, for example, a CPU or a DSP, and configured to operate various functions of a higher layer of the base station device 1120. For example, the controller 1121 generates a data packet based on data in a signal processed by the wireless communication interface 1125, and transfers the generated packet via the network interface 1123. The controller 1121 may bundle data from multiple baseband processors to generate a bundled packet, and transfer the generated bundled packet. The controller 1121 may have logical functions of performing control such as radio resource control, radio bearer control, mobility management, admission control, and scheduling. The control may be performed in conjunction with an adjacent eNB or a core network node. The memory 1122 includes a RAM and a ROM, and stores a program that is executed by the controller 1121, and various types of control data (such as a terminal list, transmission power data, and scheduling data).

The network interface 1123 is a communication interface for connecting the base station device 1120 to the core network 1124. The controller 1121 may communicate with a core network node or another eNB via the network interface 1123. In this case, the eNB 1100 and the core network node or another eNB may be connected to each other via a logic interface (such as an S1 interface and an X2 interface). The network interface 1123 may also be a wired communication interface or a wireless communication interface for a wireless backhaul line. If the network interface 1123 is a wireless communication interface, the network interface 1123 may use a higher frequency band for wireless communication than a frequency band used by the wireless communication interface 1125.

The wireless communication interface 1125 supports any cellular communication scheme (such as long term evolution (LTE) and LTE-advanced), and provides a wireless connection to a terminal located in a cell of the eNB 1100 via the antenna 1110. The wireless communication interface 1125 may generally include, for example, a baseband (BB) processor 1126 and a RF circuitry 1127. The BB processor 1126 may perform, for example, coding/decoding, modulation/demodulation and multiplexing/de-multiplexing, and perform various types of signal processing of the layer (for example L1, media access control (MAC), radio link control (RLC) and packet data convergence protocol (PDCP)). Instead of the controller 1121, the BB processor 1126 may have a portion or all of the above logical functions. The BB processor 1126 may be a memory that stores the communication control program, or a module that includes a processor and related circuitry configured to perform the program. The function of the BB processor 1126 may be changed when the programs are updated. The module may be a card or a blade that is inserted into a slot of the base station device 1120. Alternatively, the module may also be a chip that is mounted on the card or the blade. Furthermore, the RF circuitry 1127 may include, for example, a mixer, a filter, and an amplifier, and it transmits and receives a radio signal via the antenna 1110.

As show in FIG. 11, the wireless communication interface 1125 may include multiple BB processors 1126. For example, the multiple BB processors 1126 may be compatible with the multiple frequency bands used by the eNB 1100. As shown in FIG. 11, the wireless communication interface 1125 may include multiple RF circuitries 1127. For example, the multiple RF circuitries 1127 may be compatible with multiple antenna elements. Although an example in which the wireless communication interface 1125 includes multiple BB processors 1126 and multiple RF circuitries 1127 is shown in FIG. 11, the wireless communication interface 1125 may also include a single BB processor 1126 or a single RF circuitry 1127.

Second Application Example

Figure 12:
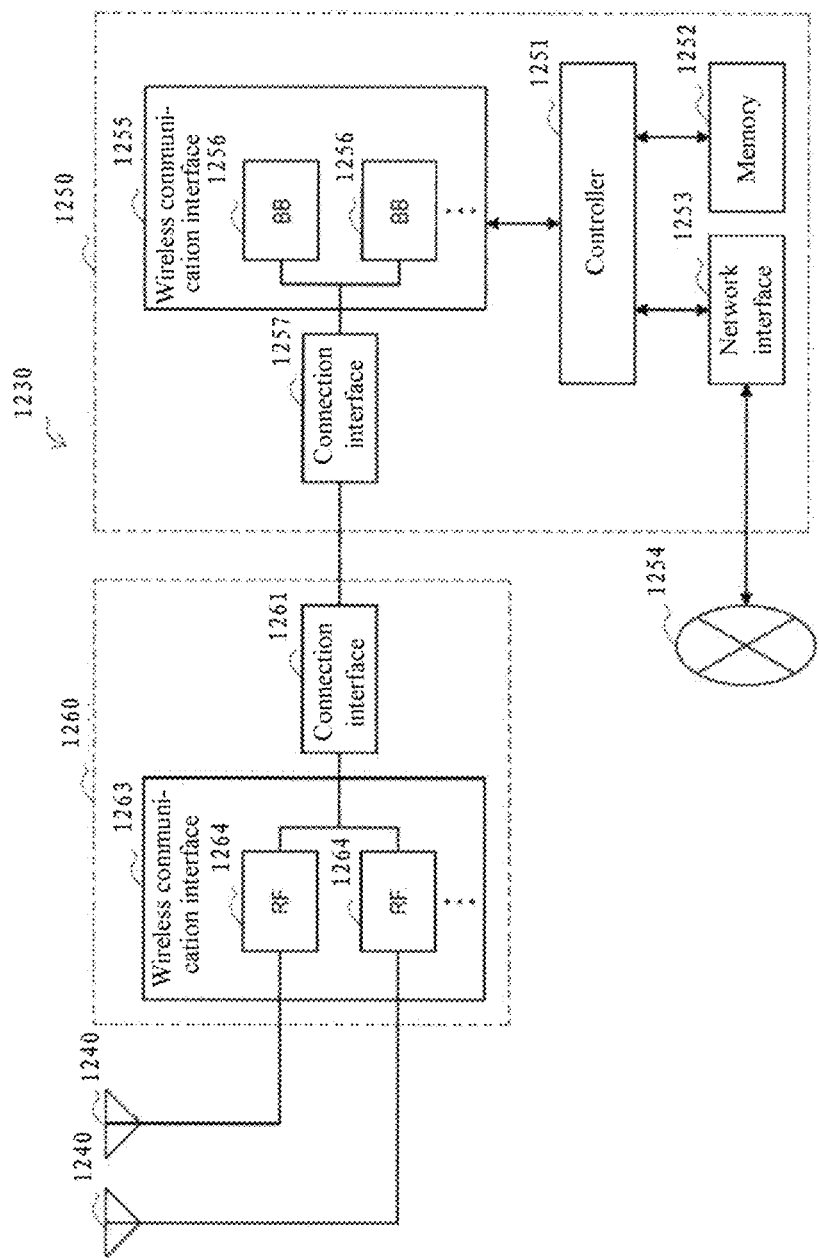
FIG. 12 is a block diagram illustrating a second example of a schematic configuration of the eNB to which the technology of the present disclosure may be applied.

FIG. 12 is a block diagram illustrating a second example of a schematic configuration of an eNB to which the technology of the present disclosure can be applied. An eNB 1230 includes one or more antennas 1240, a base station device 1250 and an RRH 1260. The RRH 1260 and each antenna 1240 may be connected to each other via an RF cable. The base station device 1250 and the RRH 1260 may be connected to each other via a high-speed line such as a fiber cable.

Each of the antennas 1240 includes one or more antenna elements (such as multiple antenna elements included in a MIMO antenna) and is used by the RRH 1260 to transmit and receive radio signals. The eNB 1230 may include the multiple antennas 1240, as shown in FIG. 12. For example, the multiple antennas 1240 may be compatible with multiple frequency bands used by the eNB 1230. Although the eNB 1230 including multiple antennas 1240 is shown in FIG. 12 as an example, the eNB 1230 may also include a single antenna 1240.

The base station device 1250 includes a controller 1251, a memory 1252, a network interface 1253, a wireless communication interface 1255, and a connection interface 1257. The controller 1251, the memory 1252, and the network interface 1253 are the same as the controller 1121, the memory 1122, and the network interface 1123 described with reference to FIG. 11.

The wireless communication interface 1255 supports any cellular communication solution (such as LTE and LTE-advanced), and provides wireless communication with a terminal located in a sector corresponding to the RRH 1260 via the RRH 1260 and the antenna 1240. The wireless communication interface 1255 may generally include, for example, a BB processor 1256. Other than connecting to an RF circuitry 1264 of the RRH 1260 via the connection interface 1257, the BB processor 1256 is the same as the BB processor 1126 described with reference to FIG. 11. As show in FIG. 12, the wireless conmmunication interface 1255 may include multiple BB processors 1256. For example, the multiple BB processors 1256 may be compatible with the multiple frequency bands used by the eNB 1230. Although FIG. 12 illustrates an example in which the wireless communication interface 1255 includes multiple BB processors 1256, the wireless communication interface 1255 may also include a single BB processor 1256.

The connection interface 1257 is an interface used to connect the base station device 1250 (wireless communication interface 1255) to the RRH 1260. The connection interface 1257 may also be a communication module for connecting the base station device 1250 (wireless communication interface 1255) to a communication in the above high-speed line of the RRH 1260.

The RRH 1260 includes a connection interface 1261 and a wireless communication interface 1263.

The connection interface 1261 is an interface used to connect the RRH 1260 (the wireless communication interface 1263) to the base station device 1250. The connection interface 1261 may also be a communication module for communication in the above high-speed line.

The wireless communication interface 1263 transmits and receives radio signals via the antenna 1240. The wireless communication interface 1263 may generally include a RF circuitry 1264, for example. The RF circuitry 1264 may include, for example, a mixer, a filter and an amplifier, and transmits and receives a radio signal via the antenna 1240. The wireless communication interface 1263 may include multiple RF circuitries 1264, as shown in FIG. 12. For example, the multiple RF circuitries 1264 may support multiple antenna elements. Although FIG. 12 illustrates the example in which the wireless communication interface 1263 includes the multiple RF circuitries 1264, the wireless communication interface 1263 may also include a single RF circuitry 1264.

In the eNB 1100 shown in FIG. 11 and the eNB 1230 shown in FIG. 12, the communicating units in the above-described electronic devices 100 and 200 may be implemented by the wireless communication interface 1125 and the wireless communication interface 1255 and/or the wireless communication interface 1263. At least part of the functions of the acquiring unit 102 and the determining unit 104 in the electronic device 100, and the generating unit, the inter-cell resource configuring unit 202, the intra-cell resource configuring unit 204 and the determining unit 206 in the electronic device 200 may also be implemented by the controller 1121 and the controller 1251.

(7-2. Application Examples Regarding the User Equipment)

First Application Example

Figure 13:
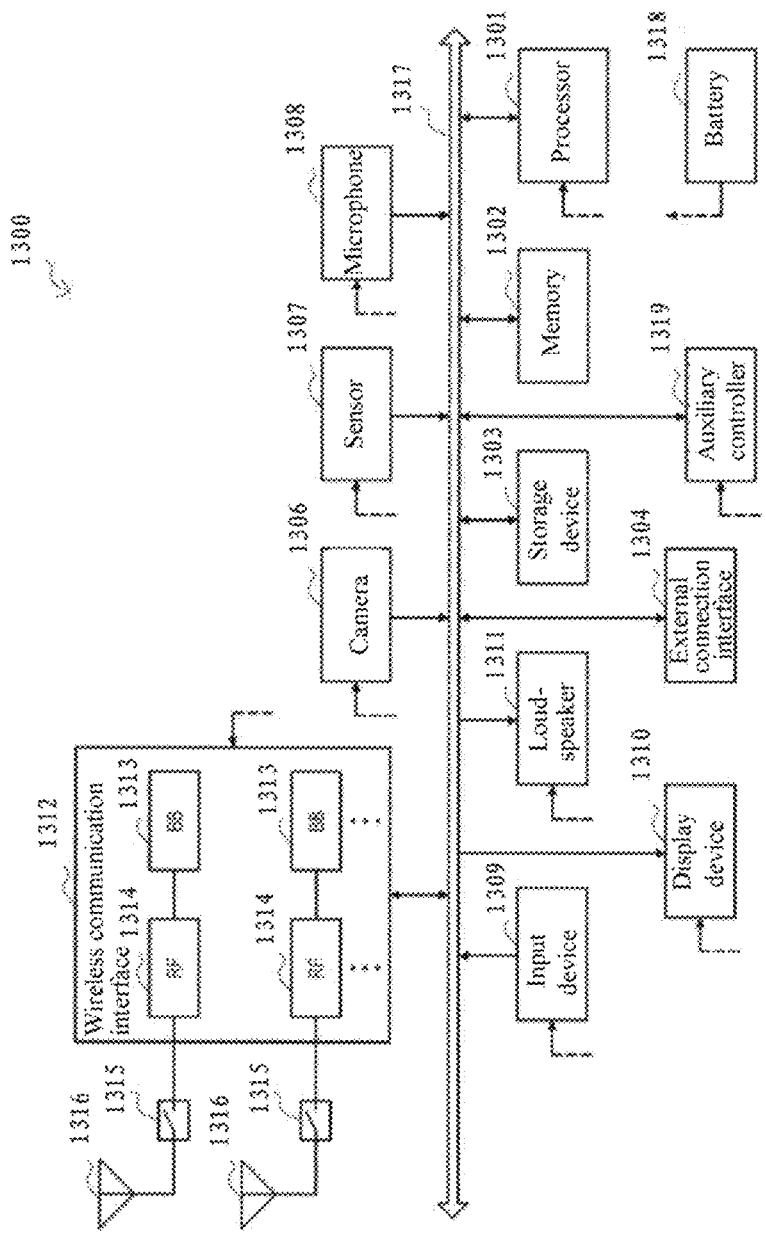
FIG. 13 is a block diagram illustrating an example of a schematic configuration of a smartphone to which the technology of the present disclosure may be applied.

FIG. 13 is a block diagram illustrating an example of a schematic configuration of a smartphone 1300 to which the technology of the present disclosure may be applied. The smartphone 1300 includes a processor 1301, a memory 1302, a storage device 1303, an external connection interface 1304, a camera 1306, a sensor 1307, a microphone 1308, an input device 1309, a display device 1310, a loudspeaker 1311, a wireless communication interface 1312, one or more antenna switches 1315, one or more antennas 1316, a bus 1317, a battery 1318, and an auxiliary controller 1319.

The processor 1301 may be, for example, a CPU or a system on a chip (SoC), and controls functions of an application layer and another layer of the smartphone 1300. The memory 1302 includes a RAM and a ROM, and stores data and programs executed by the processor 1301. The storage device 1303 may include a storage medium, such as a semiconductor memory and a hard disc. The external connection interface 1304 is an interface configured to connect a peripheral device (such as a memory card and a universal serial bus (USB) device) to the smartphone 1300.

The camera 1306 includes an image sensor (such as a charge coupled device (CCD) and a complementary metal oxide semiconductor (CMOS)), and generates a captured image. The sensor 1307 may include a group of sensors such as a measurement sensor, a gyro sensor, a geomagnetic sensor, and an acceleration sensor. The microphone 1308 converts sound that is inputted to the smartphone 1300 to audio signals. The input device 1309 includes, for example, a touch sensor configured to detect touch onto a screen of the display device 1310, a keypad, a keyboard, a button or a switch and receives an operation or information inputted from the user. The display device 1310 includes a screen (such as a liquid crystal display (LCD) and an organic light-emitting diode (OLED) display), and displays an output image of the smartphone 1300. The loudspeaker 1311 converts the audio signal that is output from the smartphone 1300 to the sound.

The wireless communication interface 1312 supports any cellular communication scheme (such as LTE and LTE-advanced) and executes wireless communication. The wireless communication interface 1312 may generally include, for example, a BB processor 1313 and an RF circuitry 1314. The BB processor 1313 may perform, for example, coding/decoding, modulation/demodulation and multiplexing/de-multiplexing, and perform various types of signal processing for wireless communication. Furthermore, the RF circuitry 1314 may include, for example, a mixer, a filter, and an amplifier, and it transmits and receives a radio signal via the antenna 1316. The wireless communication interface 1312 may be a chip module having the BB processor 1313 and the RF circuitry 1314 integrated therein. The wireless communication interface 1312 may include the multiple BB processors 1313 and the multiple RF circuitries 1314, as shown in FIG. 13. Although FIG. 13 illustrates the example in which the wireless communication interface 1312 includes the multiple BB processors 1313 and the multiple RF circuitries 1314, the wireless communication interface 1312 may also include a single BB processor 1313 or a single RF circuitry 1314.

Moreover, in addition to a cellular communication scheme, the wireless communication interface 1312 may also support another type of wireless communication scheme such as a device to device (D2D) communication scheme, a short-distance wireless communication scheme, a near field communication scheme, and a wireless local area network (LAN) scheme. In this case, the wireless communication interface 1312 may include a BB processor 1313 and a RF circuitry 1314 for each wireless communication scheme.

Each of the antenna switches 1315 switches a connection destination of the antenna 1316 among multiple circuitries (for example, circuitries for different wireless communication schemes) included in the wireless communication interface 1312.

Each of the antennas 1316 includes one or more antenna elements (such as multiple antenna elements included in a MIMO antenna) and is used by the wireless communication interface 1312 to transmit and receive radio signals. The smartphone 1300 may include the multiple antennas 1316, as shown in FIG. 13. Although FIG. 13 illustrates the example in which the smartphone 1300 includes the multiple antennas 1316, the smartphone 1300 may also include a single antenna 1316.

Furthermore, the smartphone 1300 may include the antenna 1316 with respect to each wireless communication scheme. In that case, the antenna switches 1315 may be omitted from the configuration of the smartphone 1300.

The bus 1317 connects the processor 1301, the memory 1302, the storage device 1303, the external connection interface 1304, the camera 1306, the sensor 1307, the microphone 1308, the input device 1309, the display device 1310, the loudspeaker 1311, the wireless communication interface 1312, and the auxiliary controller 1319 to each other. The battery 1318 supplies power to respective blocks of the smartphone 1300 shown in FIG. 13 via feeder lines which are partially shown as dashed lines in the figure. The auxiliary controller 1319 operates a minimum necessary function of the smartphone 1300, for example, in a sleep mode.

In the smartphone 1300 shown in FIG. 13, the communicating unit of the electronic device 600 described above may be implemented by the wireless communication interface 1312. At least a part of the functions of the first information generating unit 602 and the second information generating unit 604 may also be implemented by the processor 1301 or the auxiliary controller 1319.

Second Application Example

Figure 14:
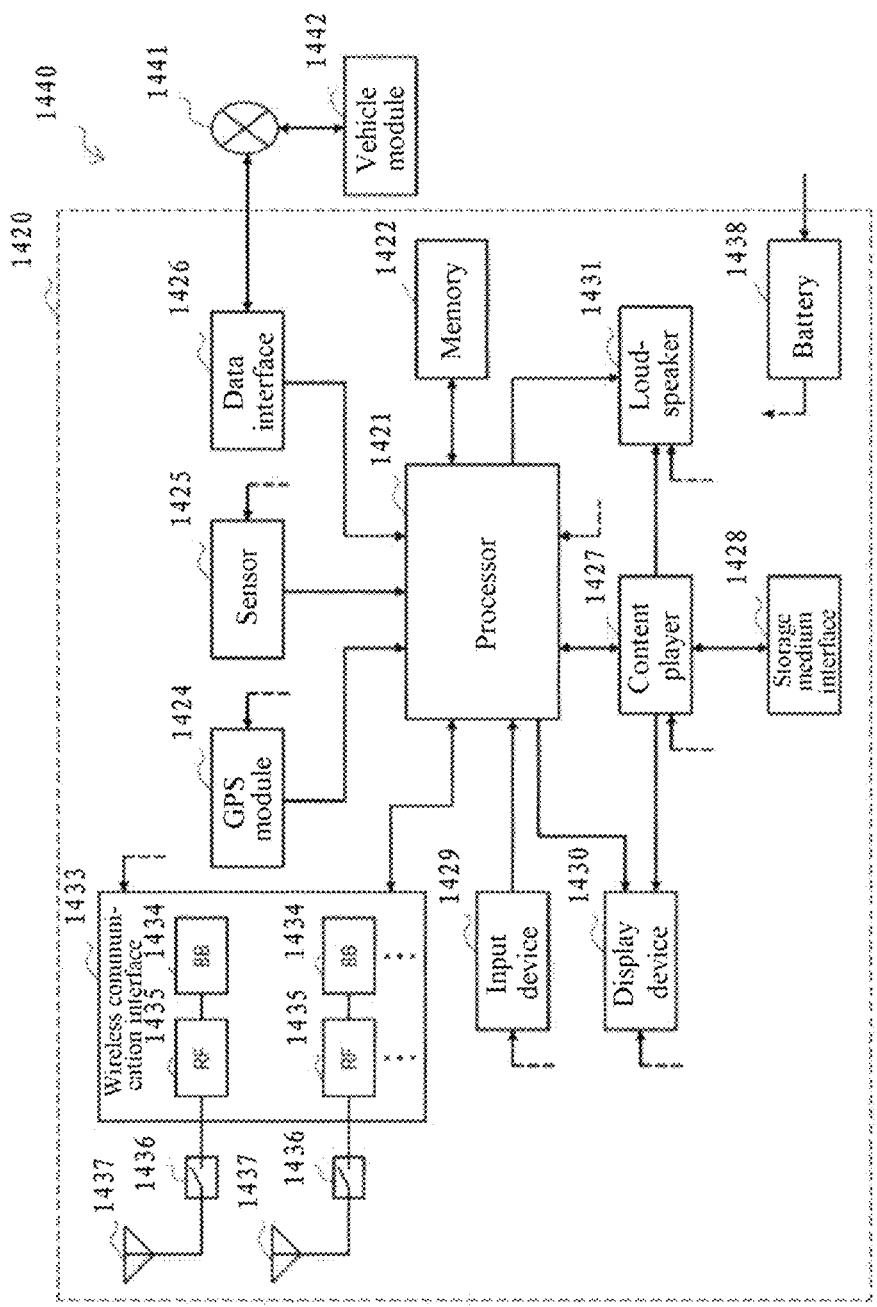
FIG. 14 is a block diagram illustrating an example of a schematic configuration of a car navigation device to which the technology of the present disclosure may be applied.

FIG. 14 is a block diagram illustrating an example of a schematic configuration of a car navigation device 1420 in which the technology according to the disclosure may be applied. The car navigation device 1420 includes a processor 1421, a memory 1422, a global positioning system (GPS) module 1424, a sensor 1425, a data interface 1426, a content player 1427, a storage medium interface 1428, an input device 1429, a display device 1430, a loudspeaker 1431, a wireless communication interface 1433, one or more antenna switches 1436, one or more antennas 1437 and a battery 1438.

The processor 1421 may be a CPU or SoC for example, and it controls a navigation function and other functions of the car navigation device 1420. The memory 1422 includes a RAM and a ROM, and stores data and programs executed by the processor 1421.

The GPS module 1424 uses GPS signals received from a GPS satellite to measure a position (such as latitude, longitude, and altitude) of the car navigation device 1420. The sensor 1425 may include a group of sensors such as a gyroscope sensor, a geomagnetic sensor and an air pressure sensor. The data interface 1426 is connected to, for example, an in-vehicle network 1441 via a terminal that is not shown, and acquires data generated by the vehicle, such as vehicle speed data.

The content player 1427 reproduces contents stored in the storage medium (such as a CD and a DVD) that is inserted into the storage medium interface 1428. The input device 1429 includes, for example, a touch sensor configured to detect touch onto a screen of the display device 1430, a button, or a switch, and receives an operation or information inputted from a user. The display device 1430 includes a screen such as a LCD or an OLED display, and displays an image of the navigation function or a content that is reproduced. The loudspeaker 1431 outputs a sound for a navigation function or the reproduced content.

The wireless communication interface 1433 supports any cellular communication scheme (such as LTE and LTE-advanced) and executes wireless communication. The wireless communication interface 1433 may generally include, for example, a BB processor 1434 and a RF circuitry 1435. The BB processor 1434 may perform, for example, coding/decoding, modulation/demodulation and multiplexing/demultiplexing, and perform various types of signal processing for wireless conmmunication. Furthermore, the RF circuitry 1435 may include, for example, a mixer, a filter, and an amplifier, and it transmits and receives a radio signal via the antenna 1437. The wireless communication interface 1433 may also be a chip module on which the BB processor 1434 and the RF circuitry 1435 are integrated. The wireless communication interface 1433 may include multiple BB processors 1434 and multiple RF circuitries 1435, as shown in FIG. 14. Although FIG. 14 illustrates the example in which the wireless communication interface 1433 includes the multiple BB processors 1434 and the multiple RF circuitries 1435, the wireless communication interface 1433 may also include a single BB processor 1434 or a single RF circuitry 1435.

Moreover, in addition to a cellular communication scheme, the wireless communication interface 1433 may also support another type of wireless communication scheme such as a device to device (D2D) communication scheme, a short-distance wireless communication scheme, a near field communication scheme, and a wireless LAN scheme. In this case, for each of the wireless communication schemes, the wireless communication interface 1433 may include a BB processor 1434 and a RF circuitry 1435.

Each of the antenna switches 1436 switches connection destinations of the antennas 1437 among multiple circuitries (such as circuitries for different wireless communication schemes) included in the wireless communication interface 1433.

Each of the antennas 1437 includes one or more antenna elements (such as multiple antenna elements included in a MIMO antenna) and is used by the wireless communication interface 1433 to transmit and receive a radio signal. As shown in FIG. 14, the car navigation device 1420 may include multiple antennas 1437. Although FIG. 14 illustrates the example in which the car navigation device 1420 includes the multiple antennas 1437, the car navigation device 1420 may also include a single antenna 1437.

In addition, the car navigation device 1420 may include respective antenna 1437 for each of the wireless communication schemes. In this case, the antenna switch 1436 may be omitted from the configuration of the car navigation device 1420.

The battery 1438 supplies power to respective blocks of the car navigation device 1420 shown in FIG. 14 via feeder lines that are partially shown as dashed lines in the figure. The battery 1438 accumulates power supplied form the vehicle.

In the car navigation device 1420 shown in FIG. 14, the communicating unit in the electronic device 600 described above may be implemented by the wireless communication interface 1433. At least a part of the functions of the first information generating unit 602 and the second information generating unit 604 may also be implemented by the processor 1421.

The technology according to the present disclosure may also be implemented as an in-vehicle system (or a vehicle) 1440 including one or more of the car navigation device 1420, an in-vehicle network 1441 and a vehicle module 1442. The vehicle module 1442 generates vehicle data such as a vehicle speed, an engine speed, and trouble information, and outputs the generated data to the in-vehicle network 1441.

The preferred embodiments of the present disclosure have been described above with reference to the drawings, and the present disclosure is not limited to the above embodiments. A person skilled in the art may make various alternations and modifications within the scope of the appended claims, and it should be understood that these alternations and modifications naturally fall within the technical scope of the present disclosure.

For example, multiple functions of one unit in the above embodiments may be implemented with separate device. Alternatively, multiple functions of multiple units in the above embodiments may be implemented with separate devices. In addition, one of the above functions may be implemented with multiple units. Needless to say, such a configuration is included in the technical scope of the present disclosure.

In the description, steps described in the flow diagrams not only include processing performed chronically in the order described, but also include processing performed concurrently or separately but not necessarily chronically. In addition, as a matter of course, the sequence may be properly changed even in steps of processing in accordance with a time sequence.

Although the present disclosure and the advantages thereof have been described in detail, it should be understood that various modifications, substitutions and variations can be made without departing from the spirit and the scope of the disclosure as defined by the appended claims. Moreover, terms "comprising", "including", or any other variant thereof in embodiments of the present disclosure are intended to encompass a non-exclusive inclusion such that processes, methods, articles, or devices that include a series of elements include not only those elements but also those that are not explicitly listed or other elements that are inherent to such processes, methods, articles, or devices. Without limiting more, the elements defined by the statement "comprising one . . . " do not exclude that there are other identical elements in the process, method, article, or device that includes said elements.

The invention claimed is:

1. An electronic device in a wireless communication system, the electronic device which operates as a base station, comprising processing circuitry configured to:
   determine, based on information indicating inter-cell interference fed back by a plurality of user equipment, one or more user pools where the plurality of user equipment are located;
   configure, for the plurality of user equipment, based on the information indicating inter-cell interference fed back by the plurality of user equipment, resources for measuring intra-cell interference in a unit of per user pool; and
   determine, based on the information indicating inter-cell interference and information indicating intra-cell interference which are fed back by the plurality of user equipment, transmission resource configuration regarding the plurality of user equipment,
   wherein the processing circuitry is further configured to divide, for each user pool, the user pool into one or more candidate groups based on number and location information of user equipment in the user pool, and to configure, for the plurality of user equipment, the resources for measuring intra-cell interference in a unit of per candidate group,
   wherein the processing circuitry is further configured to, for each user pool, set the user pool as the candidate group if the number of user equipment is smaller than or equal to a predetermined threshold, and
   wherein the processing circuitry is further configured to divide the user pool into a plurality of regions based on location information of user equipment and set each predetermined number of regions among the plurality of regions as the candidate group, if the number of user equipment is larger than the predetermined threshold.

2. The electronic device according to claim 1, wherein the electronic device further operates as a base station, and the processing circuitry is further configured to configure, for the plurality of user equipment, resources for measuring inter-cell interference.

3. The electronic device according to claim 2, wherein the configured resources for measuring inter-cell interference comprises one of channel state information-interference measurement (CSI-IM) resources, non-zero power channel state information-reference signal (NZP CSI-RS) resources and demodulation reference signal (DMRS) resources.

4. The electronic device according to claim 3, wherein the processing circuitry is further configured to: generate, in a case that the configured resources for measuring inter-cell interference are CIS-IM resources, information indicating respective power ranges, the information being to be sent to the plurality of user equipment so that the plurality of user equipment feed back, based on the information, information indicating respective power ranges in which respective reception powers for reference signals of neighboring cells are located as the information indicating respective inter-cell reference.

5. The electronic device according to claim 1, wherein the resources for measuring intra-cell interference configured for each user equipment comprise NZP CSI-RS resources configured at a port corresponding to the user equipment and CSI-IM resources configured at ports corresponding to other user equipment in a candidate group in which the user equipment is located.

6. The electronic device according to claim 1, wherein in a case that the number of user equipment in the user pool is larger than the predetermined threshold, the resources for measuring intra-cell interference configured for each user equipment comprise: NZP CSI-RS resources configured at a port corresponding to the user equipment and CSI-IM resources configured at ports corresponding to user equipment in other regions than the region in which the user equipment is located, within the candidate group in which the user equipment is located.

7. The electronic device according to claim 1, wherein the processing circuitry is further configured to: generate information indicating a magnitude range of inter-cell interference, the information being to be sent to the plurality of user equipment so that the plurality of user equipment feed back, based on the information, information indicating respective magnitude ranges in which the respective inter-cell interference is located as the information indicating respective inter-cell interference.

8. The electronic device according to claim 1, wherein the processing circuitry is further configured to: determine, for user equipment the information indicating inter-cell interference fed back from which is not received or the received information indicating inter-cell interference of which is higher than a predetermined threshold, to perform single user transmission with respect to the user equipment.

9. The electronic device according to claim 1, wherein the processing circuitry is further configured to: in a case that service quality of any user equipment among the plurality of user equipment is lower than a predetermined requirement, re-determine transmission resource configuration for said user equipment or perform single user transmission with respect to said user equipment.

10. An electronic device in a wireless communication system, the electronic device comprising processing circuitry configured to:
generate, based on inter-cell resource configuration of a base station, information indicating inter-cell interference suffered by user equipment, the information being to be fed back to the base station, the information being used to determine one or more user pools where the plurality of user equipment are located and to configure resources for measuring intra-cell interference in a unit of per user pool, at the base station; and
generate, based on intra-cell resource configuration of the base station, information indicating intra-cell interference suffered by the user equipment, the information being to be fed back to the base station, for the base station to determine transmission resource configuration with respect to the user equipment based on the information indicating inter-cell interference and the information indicating intra-cell interference,
wherein, for each user pool, the user pool is divided into one or more candidate groups based on number and location information of user equipment in the user pool, and the resources for measuring intra-cell interference is configured in a unit of per candidate group, for the plurality of user, at the base station,
wherein, for each user pool, the user pool is set as the candidate group if the number of user equipment is smaller than or equal to a predetermined threshold, at the base station, and
wherein the user pool is divided into a plurality of regions based on location information of user equipment and each predetermined number of regions among the plurality of regions is set as the candidate group, if the number of user equipment is larger than the predetermined threshold, at the base station.

11. The electronic device according to claim 10, wherein the processing circuitry is further configured to: generate, based on information indicating a magnitude range of inter-cell interference from the base station, information indicating a magnitude range in which the inter-cell interference suffered by the user equipment is located as the information indicating inter-cell interference.

12. The electronic device according to claim 11, wherein the processing circuitry is further configured to generate, based on the magnitude range in which the inter-cell interference suffered by the user equipment is located and a correspondence relationship between magnitude ranges and the one or more user pools, information indicating at least one use pool in which the user equipment is located as the information indicating inter-cell information.

13. The electronic device according to claim 10, wherein the processing circuitry is further configured to: measure a power at a corresponding port based on the inter-cell resource configuration of the base station and generate the information indicating inter-cell interference based on the measured power; or
wherein the processing circuitry is further configured to: request, in a case that service quality of the user equipment is lower than a predetermined requirement, the base station to re-determine the transmission resource configuration with respect to the user equipment.

14. The electronic device according to claim 10, wherein the processing circuitry is further configured to feed back the information indicating inter-cell interference in a form of single user-channel quality indicator (SU-CQI); or
wherein the processing circuitry is further configured to feed back the information indicating intra-cell interference in a form of multiple user-channel quality indicator (MU-CQI) or a difference between the MU-CQI and single user-channel quality indicator (SU-CQI).

15. A method in a wireless communication system, the method comprising:
determining, based on information indicating inter-cell interference fed back by a plurality of user equipment, one or more user pools where the plurality of user equipment are located;
configuring, for the plurality of user equipment, based on the information indicating inter-cell interference fed back by the plurality of user equipment, resources for measuring intra-cell interference in a unit of per user pool; and
determining, based on the information indicating inter-cell interference and information indicating intra-cell interference which are fed back by the plurality of user equipment, transmission resource configuration regarding the plurality of user equipment,
wherein, for each user pool, the user pool is divided into one or more candidate groups based on number and location information of user equipment in the user pool, and the resources for measuring intra-cell interference is configured in a unit of per candidate group, for the plurality of user, at a base station,
wherein, for each user pool, the user pool is set as the candidate group if the number of user equipment is smaller than or equal to a predetermined threshold, at the base station, and wherein the user pool is divided into a plurality of regions based on location information of user equipment and each predetermined number of regions among the plurality of regions is set as the candidate group, if the number of user equipment is larger than the predetermined threshold, at the base station.

16. A method in a wireless communication system, the method comprising:
   generating, based on inter-cell resource configuration of a base station, information indicating inter-cell interference suffered by user equipment, the information being to be fed back to the base station, the information being used to determine one or more user pools where the plurality of user equipment are located and to configure resources for measuring intra-cell interference in a unit of per user pool, at the base station; and
   generating, based on intra-cell resource configuration of the base station, information indicating intra-cell interference suffered by the user equipment, the information being to be fed back to the base station, for the base station to determine transmission resource configuration with respect to the user equipment based on the information indicating inter-cell interference and the information indicating intra-cell interference,
   wherein, for each user pool, the user pool is divided into one or more candidate groups based on number and location information of user equipment in the user pool, and the resources for measuring intra-cell interference is configured in a unit of per candidate group, for the plurality of user, at the base station,
   wherein, for each user pool, the user pool is set as the candidate group if the number of user equipment is smaller than or equal to a predetermined threshold, at the base station, and
   wherein the user pool is divided into a plurality of regions based on location information of user equipment and each predetermined number of regions among the plurality of regions is set as the candidate group, if the number of user equipment is larger than the predetermined threshold, at the base station.

* * * * *